(12) United States Patent
Mehta

(10) Patent No.: US 12,529,706 B2
(45) Date of Patent: Jan. 20, 2026

(54) MONITORING DEVICE FOR MONITORING A SAMPLE HANDLING SYSTEM

(71) Applicant: Roche Diagnostics Operations, Inc., Indianapolis, IN (US)

(72) Inventor: Kumar Roshan Mehta, Ludwigsburg (DE)

(73) Assignee: ROCHE DIAGNOSTICS OPERATIONS, INC., Indianapolis, IN (US)

( * ) Notice: Subject to any disclaimer, the term of this patent is extended or adjusted under 35 U.S.C. 154(b) by 303 days.

(21) Appl. No.: 18/502,331

(22) Filed: Nov. 6, 2023

(65) Prior Publication Data

US 2024/0069046 A1     Feb. 29, 2024

Related U.S. Application Data

(63) Continuation of application No. PCT/EP2022/061972, filed on May 4, 2022.

(30) Foreign Application Priority Data

May 5, 2021  (EP) .................................... 21172225

(51) Int. Cl.
    *G01N 35/00*     (2006.01)
    *G01N 35/02*     (2006.01)
    (Continued)

(52) U.S. Cl.
    CPC ....... *G01N 35/00623* (2013.01); *G01N 35/02* (2013.01); *G06T 7/55* (2017.01);
    (Continued)

(58) Field of Classification Search
    CPC ............. G01N 35/00623; G01N 35/02; G01N 2035/00643; G01N 2035/0477;
    (Continued)

(56) References Cited

U.S. PATENT DOCUMENTS

| 9,470,702 B2 | 10/2016 | Pollack |
| 9,838,599 B1 | 12/2017 | Tam et al. |

(Continued)

FOREIGN PATENT DOCUMENTS

| CN | 105203034 | 12/2015 |
| CN | 106443650 | 2/2017 |

(Continued)

OTHER PUBLICATIONS

Deng et al., "ImageNet: A large-scale hierarchical image database," 2009 IEEE Conference on Computer Vision and Pattern Recognition, Miami, FL, 2009, pp. 248-255.

(Continued)

*Primary Examiner* — Christopher Wait
(74) *Attorney, Agent, or Firm* — Woodard, Emhardt, Henry, Reeves & Wagner, LLP

(57) ABSTRACT

A monitoring device for monitoring a sample handling system comprising:
  a sliding unit comprising a sliding surface, wherein the sliding unit is configured for sliding over a sample transport device of the sample handling system; and
  an imaging streaming unit comprising a camera, wherein the camera is configured for capturing a plurality of images, wherein the imaging streaming unit comprises an imaging communication interface for providing the plurality of captured images to a transport control system of the sample handling system.

Further disclosed is a transport control system for controlling transport of a plurality of sample container holders of a sample handling system, a sample handling system for handling a plurality of samples, a method for identifying an obstacle, a method for determining a distance between the obstacle and a monitoring device and a method for controlling a monitoring device and computer programs and computer-readable storage media for performing the methods.

12 Claims, 3 Drawing Sheets

(51) Int. Cl.
 *G06T 7/55* (2017.01)
 *G06V 10/82* (2022.01)
 *G06V 20/64* (2022.01)

(52) U.S. Cl.
 CPC .............. *G06V 10/82* (2022.01); *G06V 20/64* (2022.01); *G01N 2035/00643* (2013.01)

(58) Field of Classification Search
 CPC ........... G01N 2035/0491; G01N 35/04; G01N 35/00732; G06T 7/55; G06V 10/82; G06V 20/64; B65G 2201/0261; B65G 54/02; B65G 2203/0241; G01C 3/00
 See application file for complete search history.

(56) References Cited

U.S. PATENT DOCUMENTS

2015/0273691 A1 10/2015 Pollack
2019/0098212 A1  3/2019 Shain et al.
2021/0311083 A1* 10/2021 Espy .................. G06K 7/10297

FOREIGN PATENT DOCUMENTS

| | | |
|---|---|---|
| CN | 108209746 | 6/2018 |
| CN | 109443319 | 3/2019 |
| CN | 111700553 | 9/2020 |
| EP | 2 977 842 | 1/2016 |
| EP | 2 995 959 | 3/2016 |
| EP | 3 070 479 | 9/2016 |
| JP | 2000046288 | 2/2000 |
| JP | 2000121354 | 4/2000 |
| WO | WO 2011/138448 | 11/2011 |
| WO | WO 2019/139930 | 7/2019 |
| WO | WO 2020235110 | 11/2020 |

OTHER PUBLICATIONS

Redmon, "YOLOv3: An Incremental Improvement" 2018.
International Search Report and Written Opinion in related PCT/EP2022/061972 mailed Sep. 2, 2022.

* cited by examiner

MONITORING DEVICE FOR MONITORING A SAMPLE HANDLING SYSTEM

TECHNICAL FIELD

The invention relates to a monitoring device for monitoring a sample handling system, to a transport control system for controlling transport of a plurality of sample container holders of the sample handling system and to the sample handling system for handling a plurality of samples. The invention further relates to a method for identifying at least one obstacle, to a method for determining a distance between at least one obstacle and the monitoring device and to a method for controlling a monitoring device. Further disclosed herein are computer programs and computer-readable storage media for performing the methods. The devices and methods of the present invention, as an example, may be used in the field of medical or chemical laboratories in which typically a plurality of samples have to be handled. The samples may contain liquid samples, for example biological samples, such as blood, blood plasma, blood serum, urine, saliva or other types of bodily fluids, and/or chemical samples, such as reagents, reactants or solvents. As an example, the sample handling system may be used for processing the plurality of samples, such as for performing an analytical and/or a pre-analytical step with the samples to be handled. However, other types of applications comprising the handling of samples are also feasible.

BACKGROUND ART

In the field of medical or chemical laboratories, generally a plurality of samples, for example liquid samples, have to be handled automatically. In these laboratories, the plurality of samples may be transported through the laboratory from one location to another, for example from a pre-analytical module to an analytical module or the like. The samples are usually handled in containers which may be sealed with a cap or may be open. Therefore, a risk of spilling transported samples on transport devices may be present.

U.S. Pat. No. 9,470,702 B2 describes devices and systems for automatically deploying maintenance carriers to an automation track. These maintenance carriers can include tools appropriate for providing a maintenance operation, such as cleaning a track, aligning a pipette, and inspecting portions of the automation system. An auto-loader can be provided to selectively deploy and/or retrieve maintenance carriers and provide recharging, refilling, or disposal of carriers or cartridges used by the maintenance carriers.

EP 2 995 959 A1 discloses a laboratory sample distribution system having a recovery device, and a laboratory automation system having such a laboratory sample distribution system. The recovery device is adapted to manipulate items such as sample container carriers or sample containers on a transport plane of the laboratory sample distribution system in the case of an error condition.

CN 106443650 A, CN 109443319 A, CN 108209746 A and CN 105203034 A describe methods and devices for optically determining geometric properties by using camera modules.

WO 2019/139930 A1 describes a rover-based integrated laboratory system including autonomous mobile robots, comprising a workspace; a laboratory component within the workspace, the laboratory component being adapted to perform a laboratory technique; a labware component within the workspace that is adapted to be used in the laboratory technique; and a rover component within the workspace that is operatively connected to the laboratory and the labware components, the rover component being an autonomous mobile robot.

Despite the advantages achieved by the known methods and devices, several technical challenges remain in the field of laboratory systems. Specifically, when starting or finishing the processing of samples in the laboratory system, it may be important to have information about a location of obstacles in the laboratory system, specifically of non-moving samples. Similarly, during operation of the laboratory system, information about obstacles in the laboratory system may be difficult to obtain, specifically with regard to non-moving samples when other samples in close vicinity keep on moving. Thus, in general, lab operators need contextual information and/or visual information for localizing obstacles, specifically for localizing non-moving samples. Further, it is of great importance to determine location and characteristics of obstacles such as spilled liquid samples in the laboratory system. Specifically, it may be desirable to provide such information on-demand during operation of the laboratory system in order to take appropriate action. An operator of the laboratory system may specifically need to monitor an entire surface of the laboratory system. In general, operators have to manually survey the surface of the laboratory system for finding obstacles such as spilled samples which poses difficulties as laboratory systems are usually large systems.

Problem to be Solved

It is therefore desirable to provide devices and methods which at least partially address the above-mentioned technical challenges. Specifically, devices and methods shall be proposed which allow for automatically detecting obstacles in a sample handling system in a simple and cost-effective manner.

SUMMARY

This problem is addressed by a monitoring device for monitoring a sample handling system, a transport control system for controlling transport of a plurality of sample container holders of a sample handling system, a sample handling system for handling a plurality of samples and a method for identifying at least one obstacle, a method for determining a distance between at least one obstacle and a monitoring device and a method for controlling a monitoring device with the features of the independent claims. Advantageous embodiments which might be realized in an isolated fashion or in any arbitrary combinations are listed in the dependent claims as well as throughout the specification.

As used in the following, the terms "have", "comprise" or "include" or any arbitrary grammatical variations thereof are used in a non-exclusive way. Thus, these terms may both refer to a situation in which, besides the feature introduced by these terms, no further features are present in the entity described in this context and to a situation in which one or more further features are present. As an example, the expressions "A has B", "A comprises B" and "A includes B" may both refer to a situation in which, besides B, no other element is present in A (i.e. a situation in which A solely and exclusively consists of B) and to a situation in which, besides B, one or more further elements are present in entity A, such as element C, elements C and D or even further elements.

Further, it shall be noted that the terms "at least one", "one or more" or similar expressions indicating that a feature or element may be present once or more than once typically will be used only once when introducing the respective feature or element. In the following, in most cases, when referring to the respective feature or element, the expressions "at least one" or "one or more" will not be repeated, non-withstanding the fact that the respective feature or element may be present once or more than once.

Further, as used in the following, the terms "preferably", "more preferably", "particularly", "more particularly", "specifically", "more specifically" or similar terms are used in conjunction with optional features, without restricting alternative possibilities. Thus, features introduced by these terms are optional features and are not intended to restrict the scope of the claims in any way. The invention may, as the skilled person will recognize, be performed by using alternative features. Similarly, features introduced by "in an embodiment of the invention" or similar expressions are intended to be optional features, without any restriction regarding alternative embodiments of the invention, without any restrictions regarding the scope of the invention and without any restriction regarding the possibility of combining the features introduced in such way with other optional or non-optional features of the invention.

In a first aspect, a monitoring device for monitoring a sample handling system is disclosed.

The term "sample handling system" as used herein is a broad term and is to be given its ordinary and customary meaning to a person of ordinary skill in the art and is not to be limited to a special or customized meaning. The term specifically may refer, without limitation, to an arbitrary system comprising at least one component configured for performing at least one function of handling at least one sample contained by at least one sample container. The sample, for example, may be a liquid sample contained by a sample container. In particular, the sample handling system comprises a plurality of components which may be configured for interacting together to perform the at least one function of handling samples. Further, each of the components of the sample handling system may be configured for performing at least one function of handling samples. The sample handling system may be configured for performing a plurality of different functions of handling liquid samples. The sample handling system may specifically be configured for automatically handling samples, specifically for handling samples individually, such as one sample after another and/or a plurality of samples simultaneously. The sample handling system may be configured for handling a plurality of samples, specifically for handling a plurality of liquid samples contained by a plurality of sample containers. The sample handling system may be part of an automated laboratory, in particular of an automated workflow series.

The term "sample" as used herein is a broad term and is to be given its ordinary and customary meaning to a person of ordinary skill in the art and is not to be limited to a special or customized meaning. The term specifically may refer, without limitation, to an aliquot of a substance such as a chemical or biological compound. Specifically, the sample may be or may comprise at least one biological specimen, such as one or more of: blood; blood serum; blood plasma; urine; saliva. Additionally or alternatively, the sample may be or may comprise a chemical substance or compound and/or a reagent. The sample may specifically be a liquid sample, such as an aliquot of a fluid substance of the chemical or biological compound. For example, the liquid sample may be or may comprise at least one pure liquid, such as a liquid substance and/or a solution containing one or more liquid substances, comprising the at least one chemical and/or the biological substance. As another example, the liquid sample may be or may comprise a liquid mixture, such as a suspension, an emulsion and/or a dispersion of one or more chemical and/or biological substances. However, other, in particular non-liquid samples are possible. For example, the sample container may be a reagent container. Other sample types may be, for example, tissue or homogenized material.

The term "sample container" as used herein is a broad term and is to be given its ordinary and customary meaning to a person of ordinary skill in the art and is not to be limited to a special or customized meaning. The term specifically may refer, without limitation, to a receptacle configured for one or more of containing, storing and/or transporting a sample, specifically a liquid sample. Further, the sample container may be configured for being handled in the sample handling system. Specifically, the sample container may be used in the field of medical and/or chemical laboratories. For example, the sample container may be selected from the group consisting of: a vessel; a vial; a syringe; a cartridge; an ampoule; a tube. For example, the sample container may comprise a sample container body for containing the sample and a sample container closure, such as a cap for sealing the sample container. For example, the sample container may comprise a sample tube, wherein the sample tube, as an example, may be positioned in the sample container holder, with an open end pointing upwards. The sample tube may be an arbitrary individual container for transporting, storing and/or processing a content received by the sample tube. The sample tube may be a piece of laboratory glass- or plasticware optionally comprising a cap on its upper end. For example, the sample tube may be a glass or transparent plastic tube. The sample tube may be a cylindrical tube, e.g. a cylindrical tube having a circular and/or polygonal cross-section. Other types or forms of sample tubes are also possible.

The term "monitoring" the sample handling system as used herein is a broad term and is to be given its ordinary and customary meaning to a person of ordinary skill in the art and is not to be limited to a special or customized meaning. The term specifically may refer, without limitation, to a process, specifically an automated process, of continuously, discontinuously or periodically receiving and/or acquiring data of the sample handling system, specifically data describing a status of a device or a system of the sample handling system. The term may further comprise deriving secondary information from the data. For example, as status of the sample handling system may be determined using at least one of the received or acquired data and the secondary information. The process of monitoring may be performed automatically, in particular completely automatically. The process of monitoring may be performed without interaction of a user or operator. For this purpose, the monitoring may comprise generating and optionally evaluating one or more signals, wherefrom the desired information may be determined. The signals may be recorded within fixed or variable time intervals or, alternatively or in addition, at an occurrence of at least one pre-specified event.

For example, monitoring the sample handling system may comprise acquiring data on an obstacle in the sample handling system. The monitoring may further comprise deriving secondary information from the acquired data on the obstacle in the sample handling system. The process of monitoring may specifically comprise one or more of determining if an obstacle is present in the sample handling system, identifying the obstacle and determining a position of the obstacle in the sample handling system, specifically on a sample transport device.

The term "obstacle" as used herein is a broad term and is to be given its ordinary and customary meaning to a person of ordinary skill in the art and is not to be limited to a special or customized meaning. The term specifically may refer, without limitation, to any object impeding the transport of sample container holders on the sample transport device. The obstacle may specifically comprise at least one of: spilled liquid on a driving surface of the sample transport device; non-moving sample container holders containing or not containing sample containers.

The term "monitoring device" as used herein is a broad term and is to be given its ordinary and customary meaning to a person of ordinary skill in the art and is not to be limited to a special or customized meaning. The term specifically may refer, without limitation, to a device configured for monitoring another device or system. Specifically, the monitoring device may be configured for performing at least one function of determining, surveilling, testing and checking a status of the sample handling system. The monitoring device may be configured for interacting with the sample handling system to be monitored. The monitoring device may be designed to be movable in the sample handling system. The monitoring device may be designed for monitoring the sample handling system at at least two different positions of the sample handling system. Movement of the monitoring device may be controlled by at least one transport control system of the sample handling system, as will be described in more detail below.

The monitoring device comprises:
at least one transportation unit comprising at least one transportation surface, wherein the transportation unit is configured for transporting the monitoring device over at least one sample transport device of the sample handling system; and
at least one imaging streaming unit comprising at least one camera, and optionally at least one power supply, wherein the camera is configured for capturing a plurality of images, wherein the imaging streaming unit comprises at least one imaging communication interface for providing the plurality of captured images to at least one transport control system of the sample handling system.

The monitoring device may comprise:
at least one sliding unit comprising at least one sliding surface, wherein the sliding unit is configured for sliding over at least one sample transport device of the sample handling system; and
at least one imaging streaming unit comprising at least one camera, and optionally at least one power supply, wherein the camera is configured for capturing a plurality of images, wherein the imaging streaming unit comprises at least one imaging communication interface for providing the plurality of captured images to at least one transport control system of the sample handling system.

The term "transportation unit" as used herein is a broad term and is to be given its ordinary and customary meaning to a person of ordinary skill in the art and is not to be limited to a special or customized meaning. The term specifically may refer, without limitation, to a component of the monitoring device configured for transporting the monitoring device from the first position to the second position over the sample transport device. The transportation unit may be configured for transporting the monitoring device from the first position to the second position over the sample transport device by one or more of sliding, using wheels and levitating. For example, the transportation unit is a sliding unit. In the following reference is made to "sliding" as exemplary embodiment. For example, the transportation surface may be designed as sliding surface.

The term "sliding" as used herein is a broad term and is to be given its ordinary and customary meaning to a person of ordinary skill in the art and is not to be limited to a special or customized meaning. The term specifically may refer, without limitation, to movement by frictional motion between two surfaces in contact, in particular between the sliding surface and a driving surface of the sample transport device. The sliding may be or may comprise a continuous movement, for example a uniform movement, and/or a discontinuous movement, for example a stepwise movement.

The term "sliding unit" as used herein is a broad term and is to be given its ordinary and customary meaning to a person of ordinary skill in the art and is not to be limited to a special or customized meaning. The term specifically may refer, without limitation, to a component of the monitoring device enabling sliding movement over the sample transport device. Specifically, the sliding unit may comprise one or more components combined in a single unit. The one or more components of the sliding unit may be configured for interacting with each other to enable sliding.

The term "sliding surface" as used herein is a broad term and is to be given its ordinary and customary meaning to a person of ordinary skill in the art and is not to be limited to a special or customized meaning. The term specifically may refer, without limitation, to a surface of the monitoring device used for sliding. The sliding surface may be at least one mechanical part configured for providing sliding contact with the driving surface of the sample transport device. The sliding surface may be flat and/or even such that frictional motion between the sliding surface and the driving surfaces in contact is possible. The sliding surface may be a flat and/or even surface such that, during movement of the sliding unit on the sample transport device, friction between the sliding surface and the driving surface of the sample transport device is reduced.

The sliding unit may comprise at least one actuation element. The term "actuation element" as used herein is a broad term and is to be given its ordinary and customary meaning to a person of ordinary skill in the art and is not to be limited to a special or customized meaning. The term specifically may refer, without limitation, to at least one mechanical part of the sliding unit configured for interacting with at least one driving means of the sample transport device. The actuation element may be a magnetic actuation element. The actuation element may comprise at least one magnet. Specifically, the sliding unit may comprise magnetic or ferromagnetic material such as with permanent or non-permanent magnetization. The actuation element may be configured for magnetically interacting with the sample transport device, specifically with the driving means of the sample transport device. The driving means of the sample transport device may be configured for generating a varying magnetic field and applying a driving force, in particular a magnetic force, without contact to the sliding unit thereby moving the monitoring device. The sliding of the sliding unit over the sample transport device may be controllable by applying the driving force to the magnetic actuation element. Additionally, the sliding may be performed by using at least one air cushion. The sliding may be performed without involving any rails, tracks or other predetermined courses.

The sliding unit may comprise at least one housing configured for housing the actuation element. The term "housing" as used herein is a broad term and is to be given its ordinary and customary meaning to a person of ordinary skill in the art and is not to be limited to a special or customized meaning. The term specifically may refer, without limitation, to a mechanical part configured for enclosing the actuation element. The housing may be configured for providing desired distribution of magnetic flux generated by the actuation element. The housing may comprise at least one iron body.

The sliding unit may comprise one or more additional components configured for providing additional functionalities to the sliding unit, such as a position determination or a possibility of attaching further devices.

For example, the sliding unit may comprise at least one mechanical and/or electrical interface configured for receiving the imaging streaming unit and/or attaching the imaging streaming unit and/or connecting with the imaging streaming unit. The term "mechanical and/or electrical interface" as used herein is a broad term and is to be given its ordinary and customary meaning to a person of ordinary skill in the art and is not to be limited to a special or customized meaning. The term specifically may refer, without limitation, to at least one element configured for providing mechanical and/or electrical connection between the sliding unit and the imaging streaming unit. The sliding unit and the imaging streaming unit may be connected to each other, for example by at least one of a form-fit connection and a force-fit connection. The mechanical and/or electrical interface may comprise at least one hook, at least one clamping.

The sliding unit may comprise at least one electronic signaling device for providing an electronic signal by sliding over the sample transport device. As will be outlined in further detail below, the sample transport device may comprise a plurality of inductive sensors. The electronic signaling device may be configured for interacting with the inductive sensors of the sample transport device. Specifically, by sliding over the sample transport device, the electronic signaling device may be configured for inducing a signal in the inductive sensors of the sample transport device. The electronic signaling device may comprise an electrically conducting element, specifically being made of at least one electroconductive element. For example, the electronic signaling device may comprise a copper disc. The electronic signaling device may be used to determine a position of the sliding unit on the sample transport device, specifically by detecting the electronic signal via the plurality of inductive sensors of the sample transport device. The position of the transportation unit, e.g. of the sliding unit, on the sample transport device may also be referred to as "sliding position".

The monitoring device, in particular the sliding unit, may comprise at least one passive or active RFID chip. The sample handling system may comprise at least one RFID reader configured for identification of the monitoring device and/or determining the position of the sliding unit on the sample transport device.

The term "sample transport device" as used herein is a broad term and is to be given its ordinary and customary meaning to a person of ordinary skill in the art and is not to be limited to a special or customized meaning. The term specifically may refer, without limitation, to a device configured for moving and/or transporting and/or transferring and/or carrying objects from one position to another. The sample transport device may be configured for moving at least one of a sample container holder and/or the monitoring device through the sample handling system. Specifically, the sample transport device may be configured for simultaneously moving a plurality of sample container holders and/or one or more monitoring devices through the sample handling system such as from a first position to a second position of the sample transport device being different from the first position. The sample transport device may be or may comprise a multilane transport system having a plurality of transport elements. The sample transport device may be or may comprise a plurality of parallel transport elements. The transport devices may be arranged in a common plane and/or in different planes such as on top of each other. The sample transport device may be designed as disclosed in WO 2011/138448 A1.

The sample transport device may comprise at least one driving surface. The term "driving surface" as used herein is a broad term and is to be given its ordinary and customary meaning to a person of ordinary skill in the art and is not to be limited to a special or customized meaning. The term specifically may refer, without limitation, to at least one transport plane via which the sample container holder and the monitoring device can transported, e.g. via which the sample container holder and the monitoring device can slide. The sample transport device may comprise a plurality of electromagnetic actuators, for example a plurality of electromagnetic coils. The plurality of electromagnetic actuator may be arranged, for example in a checkerboard pattern, below the driving surface and may be configured for magnetically interacting with the sliding unit.

The transportation surface may be an element of the monitoring device. The transportation surface may be an element of the sample container holder. The driving surface may be an element of the sample transport device. The driving surface and the transportation surface(s) of the monitoring device and the sample container holder may be configured for interacting such that the monitoring device and the sample container holder can be transported, e.g. via sliding, over the driving surface.

The sample transport device may comprise a plurality of sensors for determining a position of the transportation unit, e.g. the sliding unit, on the driving surface. The sample transport device may comprise a plurality of inductive sensors. The plurality of inductive sensor may be configured for determining a position of the sliding unit on the driving surface of the sample transport device.

The term "imaging streaming unit" as used herein is a broad term and is to be given its ordinary and customary meaning to a person of ordinary skill in the art and is not to be limited to a special or customized meaning. The term specifically may refer, without limitation, to an item or element configured for at least one of collecting or acquiring image data and providing the collected or acquired image data. The image imaging streaming unit comprises the at least one camera. The imaging streaming unit may comprise, besides the camera, one or more data processing devices, for example one or more data processors, for providing the acquired image data directly via the computer network. The imaging streaming unit may specifically be configured for acquiring image data and for providing the acquired image data within a computer network.

The term "image" as used herein is a broad term and is to be given its ordinary and customary meaning to a person of ordinary skill in the art and is not to be limited to a special or customized meaning. The term specifically may refer, without limitation, to captured by using the at least one camera, such as a plurality of electronic readings from the camera, such as of pixels of a camera chip. The term "capturing" as used herein is a broad term and is to be given its ordinary and customary meaning to a person of ordinary skill in the art and is not to be limited to a special or customized meaning. The term specifically may refer, without limitation, to one or more of imaging, image recording, image acquisition. The term "capturing" may comprise capturing a plurality of images such as a sequence of images. For example, the capturing of the plurality of images may comprise recording continuously a sequence of images such as a video or a movie. The capturing of the plurality of images image may be initiated by an action of an operator of the sample handling system or may automatically be initiated, e.g. once the presence of at least one object within a field of view and/or within a predetermined sector of the field of view of the camera is automatically detected. Automatic image acquisition techniques are known e.g. in the field of automatic barcode readers, such as from automatic barcode reading apps. The capturing of the images may take place, as an example, by acquiring a stream or "live stream" of images with the camera. The term "stream", also denoted as video stream, as used herein is a broad term and is to be given its ordinary and customary meaning to a person of ordinary skill in the art and is not to be limited to a special or customized meaning. The term specifically may refer, without limitation, to an image data stream of arbitrary size or length comprising a plurality of images captured within at least one time frame. For example, the time frame may be an time interval. The verb "to stream" as used herein is a broad term and is to be given its ordinary and customary meaning to a person of ordinary skill in the art and is not to be limited to a special or customized meaning. The term specifically may refer, without limitation, to constantly capturing images and providing the captured images to the transport control system. The camera may be configured for capturing a video stream. For example, the camera may be configured for capturing at least 10 images, specifically at least 20 images, more specifically at least 30 images, per second. The imaging streaming unit may be configured for streaming captured frames to another computer such as of the transport control system, in particular over wireless network. The transport control system may continuously grab the frames captured by the camera. This may allow that a laboratory operator can see obstacles in almost real time. The term "frame" as used herein is a broad term and is to be given its ordinary and customary meaning to a person of ordinary skill in the art and is not to be limited to a special or customized meaning. The term specifically may refer, without limitation, to a single image comprised by a video stream. The frame may specifically refer to an image of the plurality of images.

The term "camera" as used herein is a broad term and is to be given its ordinary and customary meaning to a person of ordinary skill in the art and is not to be limited to a special or customized meaning. The term specifically may refer, without limitation, to a device having at least one imaging element configured for recording or capturing spatially resolved one-dimensional, two-dimensional or even three-dimensional optical data or information. As an example, the camera may comprise at least one camera chip, such as at least one CCD chip and/or at least one CMOS chip configured for recording images.

The camera, besides the at least one camera chip or imaging chip, may comprise further elements, such as one or more optical elements, e.g. one or more lenses. As an example, the camera may be a fix-focus camera, having at least one lens which is fixedly adjusted with respect to the camera. Alternatively, however, the camera may also comprise one or more variable lenses which may be adjusted, automatically or manually. Other cameras, however, are feasible.

The camera may comprise at least one color camera. For example, for each pixel, color information may be provided or generated, such as color values for three colors R, G, B. A larger number of color values is also feasible, such as four colors for each pixel, for example R, G, G, B. Color cameras are generally known to the skilled person. For example, each pixel of the camera chip may have three or more different color sensors, such as color recording pixels like one pixel for red (R), one pixel for green (G) and one pixel for blue (B). For each of the pixels, such as for R, G, B, values may be recorded by the pixels, such as digital values in the range of 0 to 255, depending on the intensity of the respective color. The color sensitivities of the pixels may be generated by color filters or by appropriate intrinsic sensitivities of the sensor elements used in the camera pixels. These techniques are generally known to the skilled person.

The camera may comprise at least one of: an IP camera; a wireless camera; a network camera; a light-weight camera; a single vision camera; a wide-angle camera; fixed focus lens camera.

The imaging streaming unit may comprise at least four cameras. A field of view of the four cameras may be rotated by 90° with respect to each other. The field of view may be a range of the environment visible through the camera. The cameras may be arranged having a wide-angle view and/or a direction towards the driving surface. The cameras may be tilted towards the driving surface. As an example, the field of view of the camera may have a horizontal angle of view of at least 90°. The imaging streaming unit, specifically comprising the four cameras, may be configured for providing an omnidirectional field of view. The cameras of the imaging streaming unit may be directed towards the sample transport device, specifically towards the driving surface of the sample transport device, i.e. tilted at a horizontal angle of at least 15° towards the sample transport device. Other embodiments with two, three of more than four cameras are feasible.

The term "communication interface" as used herein is a broad term and is to be given its ordinary and customary meaning to a person of ordinary skill in the art and is not to be limited to a special or customized meaning. The term specifically may refer, without limitation, to an interface forming a boundary configured for transferring data or information. In particular, the communication interface may be configured for transferring data or information from a computational device, e.g. a computer, such as to send or output data or information, e.g. onto another device. Additionally or alternatively, the communication interface may be configured for transferring data or information onto a computational device, e.g. onto a computer, such as to receive information. The communication interface may specifically provide means for transferring or exchanging data or information. In particular, the communication interface may provide a data transfer connection, e.g. Bluetooth, NFC, inductive coupling or the like. As an example, the communication interface may be or may comprise at least one port comprising one or more of a network or internet port, a USB-port and a disk drive. The communication interface may be at least one web interface. The imaging streaming unit may comprise at least one communication interface denoted, as imaging communication interface. The imaging communication interface of the imaging streaming unit may be configured for providing the captured video stream to the transport control system. For example, the imaging communication interface may specifically be configured for transferring image data acquired by the camera to a computational device, such as a computer or a computer network of the transport control system. For example, the imaging communication interface may be configured for transferring the plurality of captured images to the computational device. The transferring of the image data from the imaging communication interface to the computational device may comprise an internet-based protocol, such as a transmission control protocol. The imaging communication interface may comprise at least one wireless communication interface.

The monitoring device, specifically the imaging unit, may comprise the at least one power supply for providing electric power to the imaging streaming unit. The power supply may be or may comprise at least one power source. For example, the power supply may comprise at least one battery system, such as a battery system comprising a plurality of, in particular vertically stacked, batteries or a battery system comprising a single battery. The power supply may be configured for providing an electric voltage of at least 4.8 V to the imaging streaming unit. For example, the imaging streaming device may comprise an ESP32 module with at least one IP camera and may be provided with electrical power by the power supply, for example by rechargeable battery system, providing at least 4.8 V.

In a further aspect, a transport control system for controlling transport of a plurality of sample container holders of a sample handling system is disclosed. For definitions and embodiments, for example of the sample handling system, reference is made to the definitions and embodiments as outlined in the context of the monitoring device.

The term "sample container holder" as used herein is a broad term and is to be given its ordinary and customary meaning to a person of ordinary skill in the art and is not to be limited to a special or customized meaning. The term specifically may refer, without limitation, to an arbitrary device configured for receiving at least one sample container. The receiving of the sample container may comprise at least partially enclosing and holding the sample container. Specifically, the sample container holder may be shaped such that the sample container holder may allow for receiving at least one sample container. For example, if the sample container comprises a sample tube, e.g. a sample container having a cylindrical elongated shape, the sample container holder may comprise a circular intake configured for at least partially enclosing and holding the sample tube. For example, the sample container holder may be a single sample container holder. The term "single" sample container holder as used herein is a broad term and is to be given its ordinary and customary meaning to a person of ordinary skill in the art and is not to be limited to a special or customized meaning. The term specifically may refer, without limitation, to the fact that each sample container holder carriers only one sample container. The single sample container holder may be configured for receiving one single sample container. As another example, the sample container holder may be configured for receiving a plurality of sample containers. For example, the sample container holder may be configured for transporting five sample containers, as disclosed in EP 3 070 479, the content of which is herewith included by reference. For example, the sample container holder may be or may comprise at least one rack for transporting a plurality of sample containers. For example, the sample container holder may be a single holder having a multi-adapter configured for transporting a plurality of sample containers. For example, the sample container holder may be a single sample container holder and the sample container may be a sample tube comprising a plurality of sub-container for transporting a plurality of samples. The sample container holder may be configured for being moved by the sample transport device.

The sample container holder may comprise at least one transportation unit, e.g. a sliding unit, and at least one holding unit. The transportation unit, e.g. the sliding unit, of the sample container holder may specifically embodied identical to the transportation unit, e.g. the sliding unit, of the monitoring device. The monitoring device and the sample container holder may use the same principle of transportation. Again, reference is made in the following to a "sliding unit" as exemplary embodiment. The sliding unit and the holding unit may be connected to each other, for example by at least one of a form-fit connection and a force-fit connection. The connection may comprise at least one of a hook, a clamping or the like. The holding unit may be configured for receiving and holding the sample container. As outlined above, the sliding unit of the sample container holder may be configured for sliding over the sample transport device.

The term "controlling transport" as used herein is a broad term and is to be given its ordinary and customary meaning to a person of ordinary skill in the art and is not to be limited to a special or customized meaning. The term specifically may refer, without limitation, to a process of one or more of determining, assessing, verifying, maintaining or setting movement of the sample container holders on the sample transport device. Specifically, controlling transport may comprise determining and setting one or more transport properties such as transport speed, transport direction or the like. As outlined above, the transport of the sample container holders on the sample transport device may be an individual transport of single transport holders. Thus, controlling transport may comprise controlling transport properties of each sample container holder individually.

The term "transport control system" as used herein is a broad term and is to be given its ordinary and customary meaning to a person of ordinary skill in the art and is not to be limited to a special or customized meaning. The term specifically may refer, without limitation, to a system configured for performing the process of controlling transport of the sample container holders. Specifically, the transport control system may be configured for controlling the sample transport device thereby controlling transport of the sample container holders on the sample transport device. The transport control system may be configured for controlling sliding of sample container holders over the sample transport device. The transport control system may be configured for controlling sliding of the monitoring device over the sample transport device.

The transport control system may be configured for determining a position of a sample container holder on the sample transport device. As outlined above, the sample transport device may comprise a plurality of inductive sensors for determining a position of the sample container holders and/or the transportation unit, e.g. the sliding unit, on the driving surface of the sample transport device. The transport control system may be configured for determining a signal of the plurality of inductive sensors indicating the position of the transportation unit, e.g. the sliding unit, on the driving surface and for determining the position of the transportation unit, e.g. the sliding unit.

The transport control system comprises at least one control communication interface. The transport control system further comprises at least one processing unit for evaluating a plurality of images thereby deriving at least one item of information on at least one obstacle. Deriving the at least one item of information comprises applying at least one trained object classification and detection model on the plurality of images. The transport control system is configured for controlling a functionality of a sample transport device of the sample handling system based on the item of information.

The term "control communication interface" as used herein is a broad term and is to be given its ordinary and customary meaning to a person of ordinary skill in the art and is not to be limited to a special or customized meaning. The term specifically may refer, without limitation, to a communication interface of the transport control system. The control communication interface may specifically be configured for exchanging data or information with the imaging communication interface of the monitoring device. The control communication interface may retrieve the plurality of captured images provided by the imaging communication interface.

The term "processing unit" as used herein is a broad term and is to be given its ordinary and customary meaning to a person of ordinary skill in the art and is not to be limited to a special or customized meaning. The term specifically may refer, without limitation, to a device, such a single device or a plurality of devices, comprising at least one computational element, such as at least one processor. As used herein, the term "processor" may refer to an arbitrary logic circuitry configured for performing basic operations of a computer or system, and/or, generally, to a device which is configured for performing calculations or logic operations. In particular, the processor may be configured for processing basic instructions that drive the computer or system. As an example, the processor may comprise at least one arithmetic logic unit (ALU), at least one floating-point unit (FPU), such as a math coprocessor or a numeric coprocessor, a plurality of registers, specifically registers configured for supplying operands to the ALU and storing results of operations, and a memory, such as an L1 and L2 cache memory. In particular, the processor may be a multi-core processor. Specifically, the processor may be or may comprise a central processing unit (CPU). Specifically, the processor may be or may comprise at least one Graphics Processing Unit (GPU). Additionally or alternatively, the processor may be or may comprise a microprocessor, thus specifically the processor's elements may be contained in one single integrated circuitry (IC) chip. Additionally or alternatively, the processor may be or may comprise one or more application-specific integrated circuits (ASICs) and/or one or more field-programmable gate arrays (FPGAs) and/or one or more tensor processing unit (TPU) and/or one or more chip, such as a dedicated machine learning optimized chip, or the like. The processing unit specifically may be configured, such as by software programming, for performing one or more evaluation operations.

As outlined above, the processing unit is configured for evaluating the plurality of images thereby driving the item of information on the obstacle. Specifically, the processing unit may be configured for identifying and classifying the obstacle in the plurality of images. The processing unit may be configured for detecting a color of the at least one obstacle.

The term "item of information" as used herein is a broad term and is to be given its ordinary and customary meaning to a person of ordinary skill in the art and is not to be limited to a special or customized meaning. The term specifically may refer, without limitation, to a variable or parameter comprising one or more numerical values and/or alphanumerical values. The item of information may quantify at least one property, quality, feature or characteristic of an object or device. The item of information may specifically comprise information on the obstacle. For example, the item of information on the obstacle may comprise at least one of: a presence of the obstacle; a classification of the obstacle; a position of the obstacle on a driving surface; a status of movement of the obstacle; a color of the obstacle; a distance between the monitoring device and the obstacle.

The item of information may be derived by applying at least one trained object classification and detection model on the plurality of images. For example, the trained object classification and detection model may be applied on the frames from each of the cameras.

The object classification and detection model may specifically comprises a pre-trained convolutional neural network. The term "object classification and detection model" as used herein is a broad term and is to be given its ordinary and customary meaning to a person of ordinary skill in the art and is not to be limited to a special or customized meaning. The term specifically may refer, without limitation, to at least one machine learning and/or deep learning architecture configured for object recognition and/or identification of an object in the plurality of images and classifying the detected object, in particular assigning a class label to the detection object. The object classification and detection model may comprise at least one convolutional neural network. The convolutional neural network may be a multilayer convolutional neural network. The convolutional neural network may comprise a plurality of convolutional layers. The convolutional layers may be one-dimensional layers, i.e. the convolution is applied to a one-dimensional time domain. The convolutional layers may be followed by a plurality of fully connected layers. The convolutional neural network may comprise a plurality of pooling layers. The structure of convolutional neural networks is generally known to the skilled person such as from https://en.wikipedia.org/wiki/Convolutional_neural_network#Convolutional. The object classification and detection model may comprise at least one convolutional neural network selected from the group consisting of: AlexNet; Visual Geometry Group ("VGG") Net; residual neural network ("ResNet"); You Only Look Once ("YOLO"); Fast Region-Based Convolutional Network method ("R-CNN"), Region-based Fully Convolutional Network ("R-FCN"), Single Shot Detector ("SSD"), Spatial Pyramid Pooling (SPP-Net). Additionally or alternatively, it may be possible to use classical classification machine learning algorithms such as k-nearest neighbors algorithm ("KNN"); support vector-machine ("SVM"). It may be possible to use classical classification machine learning algorithms such as KNN or SVM to classify and localize the detected obstacle, in particular in case of spilled liquids as the shape of spilled liquid is usually very different from sample container holder. Also, the color of urine samples may be different from blood samples such as a distinction between blood and urine is possible by using the color camera.

The term "trained object classification and detection model" as used herein is a broad term and is to be given its ordinary and customary meaning to a person of ordinary skill in the art and is not to be limited to a special or customized meaning. The term specifically may refer, without limitation, to a model for detecting and classifying objects which was trained on at least one training dataset, also denoted as "training data". In particular, the trained object classification and detection model was trained on existing data that has a priori been classified by experts. The object classification and detection model was pre-trained to classify sample container holder on the driving surface and/or liquid on the driving surface. Specifically, the convolutional neural network model is based on a YOLOV3-tiny deep learning architecture was used for study the proposed concept. With respect to YOLOV3-tiny deep learning architecture reference is made to Joseph Redmon and Ali Farhadi, "YOLOv3: An Incremental Improvement" 2018, arXiv:1804.02767 the content of which is included herewith by reference. The YOLOV3-tiny deep learning architecture can be 1000× faster than Region-based Convolutional Neural Networks (R-CNN) and 100× faster than Fast R-CNN with similar or better prediction accuracy. A quick inference time for classification may be an important consideration for choosing the CNN architecture. The training image data may comprise a plurality of images of the transport surface having different obstacles like spilled liquid e.g., blood sample spillage, urine sample spillage and a sample carrier with or without sample container. The plurality of images may comprise images of the transport surface in different states having varying indoor lighting conditions and/or distance between the viewpoint and the obstacle. Specifically, the method may comprise at least one training step, the training step may comprise generating at least one training data set. The training data set may be a set of labelled sample data. The training data set may be generated by capturing a set of multiple images of at least a part of the transport surface. In addition, illumination and lighting conditions may be varied for the set of multiple images. In addition, the distance between the monitoring device camera and obstacle may be varied for the set of multiple images. The captured set of multiple images may be annotated manually and the region of interest, such as bounding boxes, labelled as an obstacle. The obstacle may be further classified into the category like urine, blood and the like.

The training of the model may comprise using transfer learning techniques as it save training time, usually results in better performance of neural networks, and not needing a lot of training data. Specifically, the model, in particular the YOLOv3-tiny model, may use convolutional weights that are pre-trained on image data such as on the ImageNet dataset as described e.g. in J. Deng, W. Dong, R. Socher, L. Li, Kai Li and Li Fei-Fei, "ImageNet: A large-scale hierarchical image database," 2009 IEEE Conference on Computer Vision and Pattern Recognition, Miami, FL, 2009, pp. 248-255, doi: 10.1109/CVPR.2009.5206848. The benefit behind using transfer learning techniques, a model which is already trained to detect generic objects such as a human, car, bike and the like can learn quickly how to determine the obstacle on the transport surface as a lower convolution layer in the CNN model already knows how to identify tiny features like lines, edges, dots etc. For training the model to be able to accurately determine the obstacle on the transport surface, the training data set may be split into a training set and test set, for example, into 4::1 proportion which is then used during the training phase of the model and to calculate the loss function value which may have to be minimized to increase detection accuracy. The settings of the standard YOLOV3-tiny model may be further adjusted and hyperparameters may be tuned to be able to detect the obstacle on the transport surface and to allow additional training, in particular re-training, of the already trained model. The parameters of the model, in particular convolutional weights of the YOLOV3-tiny model, may get updated during training. If further images of interest are collected then the same trained model can be re-trained to increase the accuracy. The trained model may be configured for classifying multiple obstacles in an image region.

The controlling the functionality of the sample transport device may comprise controlling transportation, e.g. sliding, of one or more of the monitoring device and the sample container holders.

The sample transport device may be configured for transporting, e.g. sliding, one or more of the monitoring device and the sample container holders from a first position to a second position. For example, in case of sliding, the sliding may be induced by the magnetic force applied to the sliding unit of the monitoring device and/or the sample container holders. The transport control system may be configured for controlling the sample transport device, specifically the electromagnetic actuators of the sample transport device. A direction of sliding of the monitoring device and/or the sample container holders may be adjustable by controlling the corresponding electromagnetic actuators, as exemplarily described in WO 2011/138448 A1.

The controlling the functionality of the sample transport device based on the item of information may specifically comprise adapting the transport of the sample container holders taking into account the item of information on the obstacle. The transport control system may be configured for managing routing of the plurality of sample container holders. Thus, if an obstacle, such as an unexpected sample container holder or a spilled liquid sample, is detected by the processing unit, the position of the obstacle on the sample transport device may be determined and the derived item of information may be used by the transport control system to adapt routing and avoid other sample container holders and/or the monitoring device to slide against or over the obstacle.

The transport control system may comprise at least one user interface such as at least one display device. The item of information about the obstacle may be displayed by the user interface. For example, at least one image or video is displayed by the user interface. In addition, a bounding box of the detected obstacle determined by the trained object classification and detection model may be displayed, in particular almost in real time. The term "user interface" as used herein is a broad term and is to be given its ordinary and customary meaning to a person of ordinary skill in the art and is not to be limited to a special or customized meaning. The term specifically may refer, without limitation, to a feature of the transport control system which is configured for interacting with its environment, such as for the purpose of unidirectionally or bidirectionally exchanging information, such as for exchange of one or more of data or commands. For example, the user interface of the transport control system may be configured to share information with a user and to receive information by the user. The user interface of the transport control system may be a feature to interact visually with a user, such as a display, or a feature to interact acoustically with the user. The user interface, as an example, may comprise one or more of: a graphical user interface; a data interface, such as a wireless and/or a wire-bound data interface. The user interface may be configured for at least one of displaying the item of information on the obstacle to the user and displaying the plurality of captured images, specifically the video stream, to the user.

The processing unit may specifically be configured for detecting the obstacle in the plurality of images and for determining a distance between the monitoring device and the obstacle. As outlined above, the transport control system may be configured for determining a position of the monitoring device on the sample transport device. The processing unit may be configured for determining the distance d between the monitoring device and the obstacle according to:

$$\frac{y_2}{y_1} = 1 - \frac{m}{d},$$

wherein $y_1$ denotes a height of the obstacle in an image at a first position, $y_2$ denotes a height of the obstacle in an image at a second position different from the first position, m denotes a distance travelled from a first position to a second position and d denotes the distance between the obstacle and the monitoring device at the first position.

The heights of the obstacle in the images captured in the first position and in the second position, $y_1$ and $y_2$, may be determined using contour and edge detection on the captured images. The heights of the obstacles in the images may be determined in pixel units. The distance travelled from the first position to the second position i.e. m may be determined by analyzing movement of the monitoring device on the sample transport device. The monitoring device may be able to be transported horizontally and/or vertically on the sample transport device. The sample transport device may comprise multiple driving surfaces, wherein the dimensions of each driving surface may be known. The monitoring device may slide from one electromagnetic actuation element of the sample transport device to another electromagnetic actuation element. The transport control system may be configured for determining the position of the monitoring device on the sample transport device. The distance between adjacent electromagnetic actuation elements may be known. Thus, it may be possible to determine the distance travelled of the monitoring device from the first position to the second position, specifically by taking into account a vertical distance and a horizontal distance travelled on the sample transport device. Further, it may be possible to detect a visible boundary between two driving surfaces of the sample transport device in the plurality of images. The visible boundary may be used as a reference position for improving an accuracy of the determined distance d.

The transport control system may comprise at least one monitoring device according to the present invention, such as according to any one of the embodiments disclosed above and/or any one of the embodiment disclosed in further detail below.

In a further aspect, a sample handling system for handling a plurality of samples is disclosed. For definitions and embodiments, for example of the sample handling system, reference is made to the definitions and embodiments as outlined in the context of the monitoring device and the transport control system.

The sample handling system comprises:
a plurality of sample container holders each configured for receiving a sample container;
at least one monitoring device according to the present invention, such as according to any one of the embodiments disclosed above and/or according to any one of the embodiments disclosed in further detail below;
at least one sample transport device configured for transporting the plurality of sample container holders and the monitoring device, wherein the sample transport device is configured for two-dimensional transport of the sample container holders and the monitoring device; and
at least one transport control system for controlling transport of the plurality of sample container holders via the sample transport device considering the item of information on the at least one obstacle.

The sample container holder may comprise at least one transportation unit, e.g. a sliding unit, and at least one holding unit for holding the sample container. Specifically, the transportation unit, e.g. the sliding unit, of the sample container may be embodied identical to the transportation unit, e.g. the sliding unit, of the monitoring device.

As outlined above, the sample transport device may comprise the at least one driving surface. The driving surface may be configured for driving the monitoring device. The monitoring device may be configured for being transported over the driving surface. The sample container holders may comprise at least one transportation unit configured for being transported over the driving surface of the sample transport device. The transportation unit, e.g. the sliding unit, specifically the sliding unit comprised by at least one of the sample container holder and the monitoring device, may be configured for being transported, e.g. by sliding, over the driving surface of the sample transport device.

The transport control system comprised by the sample handling system is a transport control system according to the present invention, such as according to any one of the embodiments disclosed above and/or according to any one of the embodiments disclosed in further detail below.

In a further aspect, a method for identifying at least one obstacle is disclosed. For definitions and embodiments of the method, reference is made to definitions and embodiments disclosed in the context of the monitoring device, the transport control system and/or the sample handling system.

The method comprises the following steps which, as an example, may be performed in the given order. It shall be noted, however, that a different order is also possible. Further, it is also possible to perform one or more of the method steps once or repeatedly. Further, it is possible to perform two or more of the method steps simultaneously or in a timely overlapping fashion. The method may comprise further method steps which are not listed.

The method comprises:
i. capturing a plurality of images at a plurality of positions of the monitoring device by using at least one monitoring device according to the present invention, such as according to any one of the embodiments disclosed above and/or any one of the embodiments disclosed in further detail below, and providing the plurality of images via at least one imaging communication interface;
ii. retrieving the plurality of images via at least one control communication interface of at least one transport control system according to the present invention, such as according to any one of the embodiments disclosed above and/or any one of the embodiments disclosed in further detail below; and
iii. identifying the obstacle by applying at least one trained object classification and detection model on the plurality of images by using at least one processing unit of the transport control system.

Specifically, step i. may comprise capturing at least one video stream at the plurality of positions by using the monitoring device. The providing the plurality of images may comprise streaming the video stream via at least one internet protocol, specifically by using the imaging communication interface.

In a further aspect, a method for determining a distance between at least one obstacle and a monitoring device is disclosed. For definitions and embodiments of the method, reference is made to definitions and embodiments disclosed in the context of the monitoring device, the transport control system and/or the sample handling system.

The method comprises the following steps which, as an example, may be performed in the given order. It shall be noted, however, that a different order is also possible. Further, it is also possible to perform one or more of the method steps once or repeatedly. Further, it is possible to perform two or more of the method steps simultaneously or in a timely overlapping fashion. The method may comprise further method steps which are not listed.

The method comprises:
  a. identifying at least one obstacle using a method for identifying at least one obstacle according to the present invention, such as according to any one of the embodiments disclosed above and/or any one of the embodiments disclosed in further detail below, at at least one first position of the monitoring device and at at least one second position of the monitoring device different from the first position by using the at least one monitoring device according to the present invention, such as according to any one of the embodiments disclosed above and/or any one of the embodiments disclosed in further detail below; and
  b. determining the distance between the obstacle and the monitoring device by analyzing at least one first image captured at the first position and at least one second image captured at the second position and by determining the distance d according to:

$$\frac{y_2}{y_1} = 1 - \frac{m}{d},$$

wherein $y_1$ denotes a height of the obstacle in the image at the first position, $y_2$ denotes a height of the obstacle in the image at the second position, m denotes a distance travelled from the first position to the second position and d denotes the distance between the obstacle and the monitoring device at the first position.

Specifically, method step a. may further comprise moving the monitoring device from the first position to the second positions of the sample handling system by using a sample transport device.

The method for determining the distance between the obstacle and the monitoring device, specifically step a. and/or step b., may be performed by using the processing unit of the transport control system. The processing unit may be configured for determining the distance between the obstacle and the monitoring device, specifically by performing the method for determining the distance between the obstacle and the monitoring device.

In a further aspect, a method for controlling a monitoring device is disclosed. For definitions and embodiments of the method, reference is made to definitions and embodiments disclosed in the context of the monitoring device, the transport control system and/or the sample handling system.

The method comprises the following steps which, as an example, may be performed in the given order. It shall be noted, however, that a different order is also possible. Further, it is also possible to perform one or more of the method steps once or repeatedly. Further, it is possible to perform two or more of the method steps simultaneously or in a timely overlapping fashion. The method may comprise further method steps which are not listed.

The method comprises:
  I. performing a method for identifying a least one obstacle according to the present invention, such as according to any one of the embodiments disclosed above and/or any one of the embodiments disclosed in further detail below, wherein at least one first image is captured at a first position of at least one monitoring device and at least one second image is captured at the second position different from the first position by using at least one monitoring device according to the present invention, such as according to any one of the embodiments disclosed above and/or any one of the embodiments disclosed in further detail below, wherein the monitoring device is transported, e.g. slided, in a first direction from the first position to the second position, wherein the first image and the second image are provided to at least one transport control system according to the present invention, such as according to any one of the embodiments disclosed above and/or any one of the embodiments disclosed in further detail below, via at least one imaging communication interface of the monitoring device and at least one control communication interface of the transport control system, wherein at least one trained object classification and detection model is applied on the first image and the second image by using at least one processing unit of the transport control system; and
  II. if an obstacle was identified, transporting, e.g. by sliding, the monitoring device to a third position in a direction different from the first direction and preceding to step III, otherwise, maintaining the first direction and transporting the monitoring device to the third position and repeating step I until an obstacle is identified;
  III. determining, by using the method for determining a distance between at least one obstacle and a monitoring device according to the present invention, such as according to any one of the embodiments disclosed above and/or any one of the embodiments disclosed in further detail below, a distance between the identified obstacle and the monitoring device;
  IV. providing at least one item of information on the identified obstacle to the transport control system if the determined distance in step III. is below a predetermined threshold, otherwise repeating step II.

The terms "first", "second", "third" as used herein, specifically as used in the context of the image, the position of the monitoring device and direction, are broad terms and are to be given their ordinary and customary meaning to a person of ordinary skill in the art and is not to be limited to a special or customized meaning. The terms specifically may indicate, without limitation, an indication of a temporal order. Thus, for example, the first image at the first position of the monitoring device may be captured prior to the second image at the second position of the monitoring device.

The term "predetermined threshold" as used herein is a broad term and is to be given its ordinary and customary meaning to a person of ordinary skill in the art and is not to be limited to a special or customized meaning. The term specifically may refer, without limitation, to a value of a distance between the monitoring device and the obstacle above which the monitoring device is transported, e.g. by sliding, in the direction of the identified obstacle and below which the monitoring device the item of information on the identified obstacle is provided to the transport control system. The threshold may specifically be a predetermined threshold, for example a threshold being set or being determinable in advance of performing the method for controlling the monitoring device. For example, the predetermined threshold may be adjustable by an operator of the sample handling system.

Further, step II. may specifically comprise transporting the monitoring device to the third position whereby the distance in between the obstacle and the monitoring device decreases. Thus, in step II., the monitoring device may be moved towards the identified obstacle. During the method for controlling the sample handling system, the monitoring device may remain on the driving surface of the sample transport device and may specifically not be transferred to further device of the sample handling system, such as to analytical or pre-analytical devices. Specifically, in the method for controlling the monitoring device, the monitoring device may use a one-step movement and may move through each logical position ensuring a complete coverage of the driving surface. This may be achieved by using a known routing algorithm used in the sample handling system. Step II. may specifically be performed by the transport control system configured for controlling transport of the sample container holders.

The methods according to the present invention may be at least partially computer-implemented. A computer or a computing system may be configured for executing a program which may cause the computer or the computing system to perform at least one of the methods according the present invention, specifically one or more of the method steps. The methods may specifically be performed automatically by the computer or the computing system.

In a further aspect of the present invention, a computer program is disclosed. The computer program comprises instructions which, when the program is executed by a computer or computer network, cause the computer or computer network to perform the method for identifying at least one obstacle according to the present invention, such as according to any one of the embodiments disclosed above and/or any one of the embodiments disclosed in further detail below. Similarly, a computer-readable storage medium is disclosed, comprising instructions which, when the program is executed by computer or computer network, cause the computer or computer network to perform the method for identifying at least one obstacle according to the present invention, such as according to any one of the embodiments disclosed above and/or any one of the embodiments disclosed in further detail below.

As used herein, the term "computer-readable storage medium" specifically may refer to non-transitory data storage means, such as a hardware storage medium having stored thereon computer-executable instructions. The computer-readable data carrier or storage medium specifically may be or may comprise a storage medium such as a random-access memory (RAM) and/or a read-only memory (ROM).

In a further aspect of the present invention, a computer program is disclosed. The computer program comprises instructions which, when the program is executed by a computer or computer network, cause the computer or computer network to perform the method for determining a distance between at least one obstacle and a monitoring device according to the present invention, such as according to any one of the embodiments disclosed above and/or any one of the embodiments disclosed in further detail below. Similarly, a computer-readable storage medium is disclosed, comprising instructions which, when the program is executed by computer or computer network, cause the computer or computer network to perform the method for determining a distance between at least one obstacle and a monitoring device according to the present invention, such as according to any one of the embodiments disclosed above and/or any one of the embodiments disclosed in further detail below.

In a further aspect of the present invention, a computer program is disclosed, comprising instructions which, when the program is executed by a computer or computer network, cause the computer or computer network to perform the method for controlling a monitoring device according to the present invention, such as according to any one of the embodiments disclosed above and/or any one of the embodiments disclosed in further detail below. Similarly, a computer-readable storage medium is disclosed, comprising instructions which, when the program is executed by computer or computer network, cause the computer or computer network to perform the method for controlling a monitoring device according to the present invention, such as according to any one of the embodiments disclosed above and/or any one of the embodiments disclosed in further detail below.

The device, systems and methods according to the present invention provide a large number of advantages over known methods and devices of similar kind. Specifically, the monitoring device may be able to provide the plurality of captured images of the sample transport device, specifically the video stream, to the transport control system. Thus, it may be possible to provide a life-stream of the plurality of images to an operator of the sample handling system. Therefore, the device according to present invention may be configured for providing visual information on the sample handling system to the operating staff.

Further, the transport control system may be configured for automatically detecting obstacles on the sample transport device and for using the derived item of information on the obstacle to adapt routing of the sample container holders via the sample transport device. Thus, obstacles present on the sample transport device may be identified automatically and transport of sample container holders may be automatically adapted to avoid moving, e.g. sliding, against or over the obstacle.

The monitoring device comprises the transportation unit, e.g. the sliding unit. The transportation unit, e.g. the sliding unit, may be designed identical and/or analogous to known transportation units, e.g. sliding units, being already used in operating sample handling systems for the sample container. Using known sliding units may allow using known transportation means for moving the monitoring device through the sample handling system. The monitoring device according to the present invention may be configured for being transported, e.g. by sliding, over the sample transport device which is also used for moving the plurality of sample container holders. Specifically and in contrast to known methods and device, such as disclosed in U.S. Pat. No. 9,470,702 B2, the devices and methods according to the present invention may reduce a number of components used for monitoring sample handling systems. Specifically, the monitoring device may be moved by the same sample transport device also used for moving the plurality of sample container holders. The methods and devices according to the present invention may reduce complexity compared with other device known in the art.

Summarizing and without excluding further possible embodiments, the following embodiments may be envisaged:

Embodiment 1: A monitoring device for monitoring a sample handling system, the monitoring device comprising:
- at least one sliding unit comprising at least one sliding surface, wherein the sliding unit is configured for sliding over at least one sample transport device of the sample handling system; and
- at least one imaging streaming unit comprising at least one camera, and optionally at least one power supply, wherein the camera is configured for capturing a plurality of images, wherein the imaging streaming unit comprises at least one imaging communication interface for providing the plurality of captured images to at least one transport control system of the sample handling system.

Embodiment 2: The monitoring device according to the preceding embodiment, wherein the imaging streaming unit is attached and/or mounted to the sliding unit.

Embodiment 3: The monitoring device according to any one of the preceding embodiments, wherein the camera of the imaging streaming unit comprises at least one of: an IP camera; a wireless camera; a network camera; a light-weight camera; a single vision camera; a wide-angle camera; fixed focus lens camera.

Embodiment 4: The monitoring device according to any one of the preceding embodiments, wherein the camera of the imaging streaming unit is configured for capturing a video stream.

Embodiment 5: The monitoring device according to the preceding embodiment, wherein the imaging communication interface of the imaging streaming unit is configured for providing the captured video stream to the transport control system.

Embodiment 6: The monitoring device according to any one of the preceding embodiments, wherein the camera of the imaging streaming unit comprises at least one color camera.

Embodiment 7: The monitoring device according to any one of the preceding embodiments, wherein the imaging streaming unit comprises at least four cameras, wherein a field of view of the four cameras are rotated by 90° with respect to each other.

Embodiment 8: The monitoring device according to any one of the preceding embodiments, wherein the imaging communication interface comprises at least one of a wire-bound communication interface and a wireless communication interface.

Embodiment 9: The monitoring device according to any one of the preceding embodiments, wherein the monitoring device comprises at least one power supply for providing electric power to the imaging streaming unit.

Embodiment 10: The monitoring device according to any one of the preceding embodiments, wherein the sliding surface is at least one mechanical part configured for providing sliding contact with at least one driving surface of the sample transport device.

Embodiment 11: The monitoring device according to any one of the preceding embodiments, wherein the sliding unit comprises at least one actuation element, wherein the sliding unit comprises at least one housing configured for housing the actuation element.

Embodiment 12: The monitoring device according to the preceding embodiment, wherein the actuation element is a magnetic actuation element, wherein the housing is configured for providing desired distribution of magnetic flux generated by the actuation element.

Embodiment 13: The monitoring device according to the preceding embodiment, wherein the actuation element is configured for magnetically interacting with the sample transport device of the sample handling system, wherein the sliding of the sliding unit over the sample transport device is controllable by applying a magnetic force to the magnetic actuation element.

Embodiment 14: The monitoring device according to any one of the preceding embodiments, wherein the sliding unit comprises at least one electronic signaling device configured for providing an electronic signal by sliding over the sample transport device.

Embodiment 15: The monitoring device according to the preceding embodiment, wherein the electronic signaling device comprises an electrically conducting element, specifically being made of at least one electroconductive element, more specifically copper.

Embodiment 16: A transport control system for controlling transport of a plurality of sample container holders of a sample handling system, comprising at least one control communication interface, the transport control system further comprising at least one processing unit for evaluating a plurality of images thereby deriving at least one item of information on at least one obstacle, wherein deriving the at least one item of information comprises applying at least one trained object classification and detection model on the plurality of images, wherein the transport control system is configured for controlling a functionality of a sample transport device of the sample handling system based on the item of information.

Embodiment17: The transport control system according to the preceding embodiment, further comprising at least one monitoring device according to any one of the preceding embodiments referring to a monitoring device.

Embodiment 18: The transport control system according to any one of the two preceding embodiments, wherein the at least one item of information on the obstacle comprises at least one of: a presence of the obstacle; a classification of the obstacle; a position of the obstacle on a driving surface; a status of movement of the obstacle; a color of the obstacle; a distance between the monitoring device and the obstacle.

Embodiment 19: The transport control system according to any one of the three preceding embodiments, wherein the trained object classification and detection model comprises a pre-trained convolutional neural network.

Embodiment 20: The transport control system according to the preceding embodiment, wherein the pre-trained convolutional neural network comprises at least one convolutional neural network selected from the group consisting of: AlexNet; VGG Net; ResNet; YOLO; R-CNN; R-FCN; SSD; SPP-Net, and/or wherein the object classification and detection model may comprise a classical classification machine learning algorithm such as KNN or SVM.

Embodiment 21: The transport control system according to any one of the five preceding embodiments, wherein the processing unit is configured for detecting a color of the at least one obstacle.

Embodiment 22: The transport control system according to any one of the six preceding embodiments, wherein the processing unit is configured for detecting the obstacle in the plurality of images and for determining a distance between the monitoring device and the obstacle.

Embodiment 23: The transport control system according to the preceding embodiment, wherein the transport control system is configured for determining a sliding position of the monitoring device on the sample transport device.

Embodiment 24: The transport control system according to the preceding embodiment, wherein the processing unit is configured for determining the distance d between the monitoring device and the obstacle according to:

$$\frac{y_2}{y_1} = 1 - \frac{m}{d},$$

wherein $y_1$ denotes a height of the obstacle in an image at a first sliding position, $y_2$ denotes a height of the obstacle in an image at a second sliding position different from the first position, m denotes a distance travelled from a first sliding position to a second sliding position and d denotes the distance between the obstacle and the monitoring device at the first sliding position.

Embodiment 25: A sample handling system for handling a plurality of samples, the sample handling system comprising:
  a plurality of sample container holders each configured for receiving a sample container;
  at least one monitoring device according to any one of the preceding embodiments referring to a monitoring device;
  at least one sample transport device configured for transporting the plurality of sample container holders and the monitoring device, wherein the sample transport device is configured for two-dimensional transport of the sample container holders and the monitoring device; and
  at least one transport control system for controlling transport of the plurality of sample container holders via the sample transport device considering the item of information on the at least one obstacle.

Embodiment 26: The sample handling system according to the preceding embodiment, wherein the sample container holder comprises at least one sliding unit and at least one holding unit for holding the sample container.

Embodiment 27: The sample handling system according to any one of the two preceding embodiments, wherein the sample transport device comprises at least one driving surface, wherein the sliding unit is configured for sliding over the driving surface of the sample transport device.

Embodiment 28: The sample handling system according to any one of the three preceding embodiments, wherein the transport control system is a transport control system according to any one of the preceding embodiments referring to a transport control system.

Embodiment 29: The sample handling system according to any one of the four preceding embodiments, wherein the sample transport device comprises a plurality of electromagnetic actuators arranged below a driving surface, wherein the electromagnetic actuators are con-figured for applying a magnetic force to a sliding unit of at least one of the monitoring device and the sample container holders.

Embodiment 30: The sample handling system according to any one of the five preceding embodiments, wherein the sample transport device comprises a plurality of inductive sensors, wherein the plurality of inductive sensors are con-figured for determining a position of a sliding unit on a driving surface of the sample transport device.

Embodiment 31: A method for identifying at least one obstacle, the method comprises:

i. capturing a plurality of images at a plurality of sliding positions by using at least one monitoring device according to any one of the preceding embodiments referring to a monitoring device and providing the plurality of images via at least one imaging communication interface;
  ii. retrieving the plurality of images via at least one control communication interface of at least one transport control system according to any one of the preceding embodiments referring a transport control system; and
  iii. identifying the obstacle by applying at least one trained object classification and detection model on the plurality of images by using at least one processing unit of the transport control system.

Embodiment 32: The method according to the preceding embodiment, wherein step i. comprises capturing at least one video stream at the plurality of sliding positions by using the monitoring device.

Embodiment 33: The method according to the preceding embodiment, wherein providing the plurality of images comprises streaming the video stream via at least one internet protocol.

Embodiment 34: A method for determining a distance between at least one obstacle and a monitoring device, the method comprising:
  a. identifying at least one obstacle using a method for identifying at least one obstacle according to any one of the preceding embodiments referring to a method for identifying at least one obstacle at at least one first sliding position and at at least one second sliding position different from the first sliding position by using at least one monitoring device according to any one of the preceding embodiments referring to a monitoring device; and
  b. determining the distance between the obstacle and the monitoring device by analyzing at least one first image captured at the first sliding position and at least one second image captured at the second sliding position and by determining the distance d according to:

$$\frac{y_2}{y_1} = 1 - \frac{m}{d},$$

wherein $y_1$ denotes a height of the obstacle in the image at the first sliding position, $y_2$ denotes a height of the obstacle in the image at the second sliding position, m denotes a distance travelled from the first sliding position to the second sliding position and d denotes the distance between the obstacle and the monitoring device at the first sliding position.

Embodiment 35: The method according to the preceding embodiment, wherein step a. further comprises moving the monitoring device from the first sliding position to the second sliding positions of the sample handling system by using a sample transport device.

Embodiment 36: A method for controlling a monitoring device, the method comprises:
  I. performing a method for identifying a least one obstacle according to any one of the preceding embodiments referring to a method for identifying at least one obstacle, wherein at least one first image is captured at a first sliding position and at least one second image is captured at the second sliding position different from the first sliding position by using at least one monitoring device according to any one of the preceding embodiments referring to a monitoring device, wherein the monitoring device is slided in a first direction from the first sliding position to the second sliding position, wherein the first image and the second image are provided to at least one transport control system according to any one of the preceding embodiments referring a transport control system via at least one imaging communication interface of the monitoring device and at least one control communication interface of the transport control system, wherein at least one trained object classification and detection model is applied on the first image and the second image by using at least one processing unit of the transport control system; and II. if an obstacle was identified, sliding the monitoring device to a third sliding position in a direction different from the first direction and preceding to step III, otherwise, maintaining the first direction and sliding the monitoring device to the third sliding position and repeating step I until an obstacle is identified;

III. determining, by using the method for determining a distance between at least one obstacle and a monitoring device according to any one of the preceding embodiments referring to a method for determining a distance between at least one obstacle and a monitoring device, a distance between the identified obstacle and the monitoring device;

IV. providing at least one item of information on the identified obstacle to the transport control system if the determined distance in step III. is below a predetermined threshold, otherwise repeating step II.

Embodiment 37: The method according to the preceding embodiment, wherein step II. comprises sliding the monitoring device to the third sliding position whereby the distance in between the obstacle and the monitoring device decreases.

Embodiment 38: A computer program comprising instructions which, when the program is executed by a computer or computer network, cause the computer or computer network to perform the method for identifying at least one obstacle according to any one of the preceding embodiments referring to a method for identifying at least one obstacle.

Embodiment 39: A computer-readable storage medium comprising instructions which, when the program is executed by computer or computer network, cause the computer or computer network to perform the method for identifying at least one obstacle according to any one of the preceding embodiments referring to a method for identifying at least one obstacle.

Embodiment 40: A computer program comprising instructions which, when the program is executed by a computer or computer network, cause the computer or computer network to perform the method for determining a distance between at least one obstacle and a monitoring device according to any one of the preceding embodiments referring to a method for determining a distance between at least one obstacle and a monitoring device.

Embodiment 41: A computer-readable storage medium comprising instructions which, when the program is executed by computer or computer network, cause the computer or computer network to perform the method for determining a distance between at least one obstacle and a monitoring device according to any one of the preceding embodiments referring to a method for determining a distance between at least one obstacle and a monitoring device.

Embodiment 42: A computer program comprising instructions which, when the program is executed by a computer or computer network, cause the computer or computer network to perform the method for controlling a monitoring device according to any one of the preceding embodiments referring to a method for controlling a monitoring device.

Embodiment 43: A computer-readable storage medium comprising instructions which, when the program is executed by computer or computer network, cause the computer or computer network to perform the method for controlling a monitoring device according to any one of the preceding embodiments referring to a method for controlling a monitoring device.

Embodiment 44: A monitoring device for monitoring a sample handling system, the monitoring device comprising:
- at least one transportation unit comprising at least one transportation surface, wherein the transportation unit is configured for being transported over at least one sample transport device of the sample handling system; and
- at least one imaging streaming unit comprising at least one camera, and optionally at least one power supply, wherein the camera is configured for capturing a plurality of images, wherein the imaging streaming unit comprises at least one imaging communication interface for providing the plurality of captured images to at least one transport control system of the sample handling system.

Embodiment 45: The monitoring device according to the preceding embodiment, wherein the imaging streaming unit is attached and/or mounted to the transportation unit.

Embodiment 46: The monitoring device according to any one of embodiments 44 to 45, wherein the camera of the imaging streaming unit comprises at least one of: an IP camera; a wireless camera; a network camera; a light-weight camera; a single vision camera; a wide-angle camera; fixed focus lens camera.

Embodiment 47: The monitoring device according to any one of embodiments 44 to 46, wherein the camera of the imaging streaming unit is configured for capturing a video stream.

Embodiment 48: The monitoring device according to the preceding embodiment, wherein the imaging communication interface of the imaging streaming unit is configured for providing the captured video stream to the transport control system.

Embodiment 49: The monitoring device according to any one of embodiments 44 to 48, wherein the camera of the imaging streaming unit comprises at least one color camera.

Embodiment 50: The monitoring device according to any one of embodiments 44 to 49, wherein the imaging streaming unit comprises at least four cameras, wherein a field of view of the four cameras are rotated by 90° with respect to each other.

Embodiment 51: The monitoring device according to any one of embodiments 44 to 50, wherein the imaging communication interface comprises at least one of a wire-bound communication interface and a wireless communication interface.

Embodiment 52: The monitoring device according to any one of embodiments 44 to 51, wherein the monitoring device comprises at least one power supply for providing electric power to the imaging streaming unit.

Embodiment 53: The monitoring device according to any one of embodiments 44 to 52, wherein the transportation surface is at least one mechanical part configured for providing contact, e.g. sliding contact, with at least one driving surface of the sample transport device.

Embodiment 54: The monitoring device according to any one of embodiments 44 to 53, wherein the transportation unit comprises at least one actuation element, wherein the transportation unit comprises at least one housing configured for housing the actuation element.

Embodiment 55: The monitoring device according to the preceding embodiment, wherein the actuation element is a magnetic actuation element, wherein the housing is configured for providing desired distribution of magnetic flux generated by the actuation element.

Embodiment 56: The monitoring device according to the preceding embodiment, wherein the actuation element is configured for magnetically interacting with the sample transport device of the sample handling system, wherein the transportation of the transportation unit over the sample transport device is controllable by applying a magnetic force to the magnetic actuation element.

Embodiment 57: The monitoring device according to any one of embodiments 44 to 56, wherein the transportation unit comprises at least one electronic signaling device configured for providing an electronic signal by sliding over the sample transport device.

Embodiment 58: The monitoring device according to the preceding embodiment, wherein the electronic signaling device comprises an electrically conducting element, specifically being made of at least one electroconductive element, more specifically copper.

Embodiment 59: A transport control system for controlling transport of a plurality of sample container holders of a sample handling system, comprising at least one control communication interface, the transport control system further comprising at least one processing unit for evaluating a plurality of images thereby deriving at least one item of information on at least one obstacle, wherein deriving the at least one item of information comprises applying at least one trained object classification and detection model on the plurality of images, wherein the transport control system is configured for controlling a functionality of a sample transport device of the sample handling system based on the item of information.

Embodiment 60: The transport control system according to the preceding embodiment, further comprising at least one monitoring device according to any one of embodiments 44 to 58.

Embodiment 61: The transport control system according to any one of the two preceding embodiments, wherein the at least one item of information on the obstacle comprises at least one of: a presence of the obstacle; a classification of the obstacle; a position of the obstacle on a driving surface; a status of movement of the obstacle; a color of the obstacle; a distance between the monitoring device and the obstacle.

Embodiment 62: The transport control system according to any one of the three preceding embodiments, wherein the trained object classification and detection model comprises a pre-trained convolutional neural network.

Embodiment 63: The transport control system according to the preceding embodiment, wherein the pre-trained convolutional neural network comprises at least one convolutional neural network selected from the group consisting of: AlexNet; VGG Net; ResNet; YOLO; R-CNN; R-FCN; SSD; SPP-Net, and/or wherein the object classification and detection model may comprise a classical classification machine learning algorithm such as KNN or SVM.

Embodiment 64: The transport control system according to any one of the five preceding embodiments, wherein the processing unit is configured for detecting a color of the at least one obstacle.

Embodiment 65: The transport control system according to any one of the six preceding embodiments, wherein the processing unit is configured for detecting the obstacle in the plurality of images and for determining a distance between the monitoring device and the obstacle.

Embodiment 66: The transport control system according to the preceding embodiment, wherein the transport control system is configured for determining a position of the monitoring device on the sample transport device.

Embodiment 67: The transport control system according to the preceding embodiment, wherein the processing unit is configured for determining the distance d between the monitoring device and the obstacle according to:

$$\frac{y_2}{y_1} = 1 - \frac{m}{d},$$

wherein $y_1$ denotes a height of the obstacle in an image at a first position of the monitoring device, $y_2$ denotes a height of the obstacle in an image at a second position of the monitoring device different from the first position, m denotes a distance travelled from a first position to a second position and d denotes the distance between the obstacle and the monitoring device at the first position.

Embodiment 68: A sample handling system for handling a plurality of samples, the sample handling system comprising:
 a plurality of sample container holders each configured for receiving a sample container;
 at least one monitoring device according to any one of embodiments 44 to 58;
 at least one sample transport device configured for transporting the plurality of sample container holders and the monitoring device, wherein the sample transport device is configured for two-dimensional transport of the sample container holders and the monitoring device; and
 at least one transport control system for controlling transport of the plurality of sample container holders via the sample transport device considering the item of information on the at least one obstacle.

Embodiment 69: The sample handling system according to the preceding embodiment, wherein the sample container holder comprises at least one transportation unit and at least one holding unit for holding the sample container.

Embodiment 70: The sample handling system according to any one of the two preceding embodiments, wherein the sample transport device comprises at least one driving surface, wherein the transportation unit is configured for being transported over the driving surface of the sample transport device.

Embodiment 71: The sample handling system according to any one of the three preceding embodiments, wherein the transport control system is a transport control system according to any one of embodiments 59 to 67.

Embodiment 72: The sample handling system according to any one of the four preceding embodiments, wherein the sample transport device comprises a plurality of electromagnetic actuators arranged below a driving surface, wherein the electromagnetic actuators are con-figured for applying a magnetic force to a transportation unit of at least one of the monitoring device and the sample container holders.

Embodiment 73: The sample handling system according to any one of the five preceding embodiments, wherein the sample transport device comprises a plurality of inductive sensors, wherein the plurality of inductive sensors are configured for determining a position of a transportation unit on a driving surface of the sample transport device.

Embodiment 74: A method for identifying at least one obstacle, the method comprises:
 i. capturing a plurality of images at a plurality of positions of a monitoring device by using at least one monitoring device according to any one of embodiments 44 to 58 and providing the plurality of images via at least one imaging communication interface;
 ii. retrieving the plurality of images via at least one control communication interface of at least one transport control system according to embodiments 59 to 67; and
 iii. identifying the obstacle by applying at least one trained object classification and detection model on the plurality of images by using at least one processing unit of the transport control system.

Embodiment 75: The method according to the preceding embodiment, wherein step i. comprises capturing at least one video stream at the plurality of positions of the monitoring device by using the monitoring device.

Embodiment 76: The method according to the preceding embodiment, wherein providing the plurality of images comprises streaming the video stream via at least one internet protocol.

Embodiment 77: A method for determining a distance between at least one obstacle and a monitoring device, the method comprising:
 a. identifying at least one obstacle using a method for identifying at least one obstacle according to embodiments 74 to 76 at at least one position of the monitoring device and at at least one second position of the monitoring device different from the first position by using at least one monitoring device according to any one of embodiments 44 to 58; and
 b. determining the distance between the obstacle and the monitoring device by analyzing at least one first image captured at the first position and at least one second image captured at the second position and by determining the distance d according to:

$$\frac{y_2}{y_1} = 1 - \frac{m}{d},$$

wherein $y_1$ denotes a height of the obstacle in the image at the first position, $y_2$ denotes a height of the obstacle in the image at the second position, m denotes a distance travelled from the first position to the second position and d denotes the distance between the obstacle and the monitoring device at the first position.

Embodiment 78: The method according to the preceding embodiment, wherein step a. further comprises moving the monitoring device from the first position to the second positions of the sample handling system by using a sample transport device.

Embodiment 79: A method for controlling a monitoring device, the method comprises:
 I. performing a method for identifying a least one obstacle according to any one of embodiments 74 to 76, wherein at least one first image is captured at a first position of the monitoring device and at least one second image is captured at the second position of the monitoring device different from the first position by using at least one monitoring device according to any one of embodiments 44 to 58, wherein the monitoring device is transported in a first direction from the first position to the second position, wherein the first image and the second image are provided to at least one transport control system according to any one of embodiments 59 to 67 via at least one imaging communication interface of the monitoring device and at least one control communication interface of the transport control system, wherein at least one trained object classification and detection model is applied on the first image and the second image by using at least one processing unit of the transport control system; and
 II. if an obstacle was identified, transporting the monitoring device to a third position in a direction different from the first direction and preceding to step III, otherwise, maintaining the first direction and transporting the monitoring device to the third position and repeating step I until an obstacle is identified;
 III. determining, by using the method for determining a distance between at least one obstacle and a monitoring device according to any one of embodiments 77 to 78, a distance between the identified obstacle and the monitoring device;
 IV. providing at least one item of information on the identified obstacle to the transport control system if the determined distance in step III. is below a predetermined threshold, otherwise repeating step II.

Embodiment 80: The method according to the preceding embodiment, wherein step II. comprises transporting the monitoring device to the third position whereby the distance in between the obstacle and the monitoring device decreases.

Embodiment 81: A computer program comprising instructions which, when the program is executed by a computer or computer network, cause the computer or computer network to perform the method for identifying at least one obstacle according to any one of embodiments 74 to 76.

Embodiment 82: A computer-readable storage medium comprising instructions which, when the program is executed by computer or computer network, cause the computer or computer network to perform the method for identifying at least one obstacle according to any one of embodiments 74 to 76.

Embodiment 83: A computer program comprising instructions which, when the program is executed by a computer or computer network, cause the computer or computer network to perform the method for determining a distance between at least one obstacle and a monitoring device according to any one of embodiments 77 to 78.

Embodiment 84: A computer-readable storage medium comprising instructions which, when the program is executed by computer or computer network, cause the computer or computer network to perform the method for determining a distance between at least one obstacle and a monitoring device according to any one of embodiments 77 to 78.

Embodiment 85: A computer program comprising instructions which, when the program is executed by a computer or computer network, cause the computer or computer network to perform the method for controlling a monitoring device according to any one of embodiments 79 to 80.

Embodiment 86: A computer-readable storage medium comprising instructions which, when the program is executed by computer or computer network, cause the computer or computer network to perform the method for controlling a monitoring device according to any one of embodiments 79 to 80.

SHORT DESCRIPTION OF THE FIGURES

Further optional features and embodiments will be disclosed in more detail in the subsequent description of embodiments, preferably in conjunction with the dependent claims. Therein, the respective optional features may be realized in an isolated fashion as well as in any arbitrary feasible combination, as the skilled person will realize. The scope of the invention is not restricted by the preferred embodiments. The embodiments are schematically depicted in the Figures. Therein, identical reference numbers in these Figures refer to identical or functionally comparable elements.

DETAILED DESCRIPTION OF THE EMBODIMENTS

Figure 1:
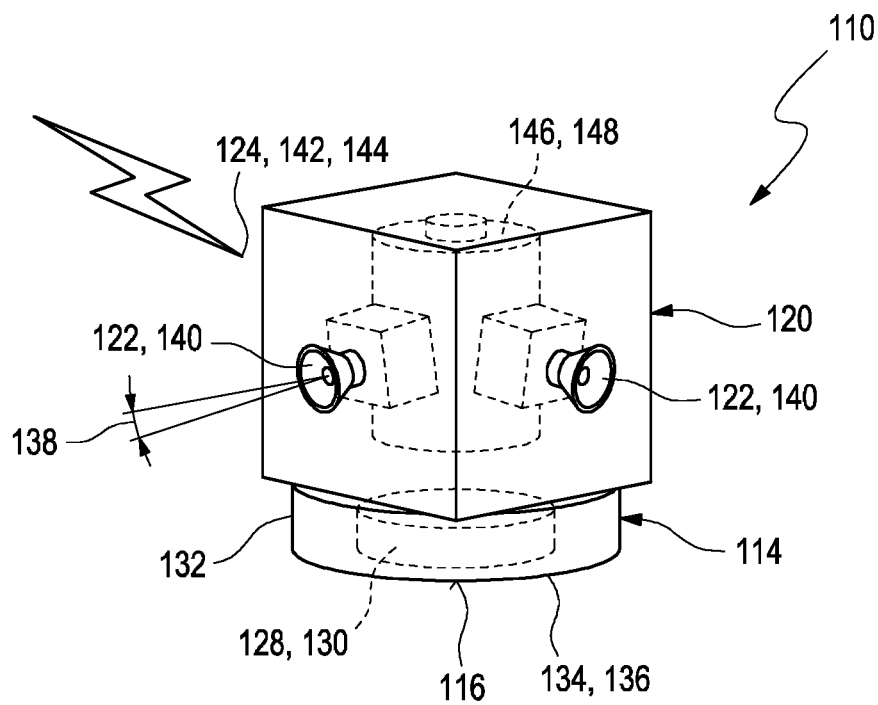
FIG. 1 shows an embodiment of a monitoring device for monitoring a sample handling system in a schematic view.

FIG. 1 shows an exemplary embodiment of a monitoring device 110 for monitoring a sample handling system 112 in a schematic view. The sample handling system 112 is not shown in FIG. 1. However, the sample handling system 112 may be a sample handling system 112 as exemplary shown in FIG. 3 and as will be described in further detail below.

The monitoring device 110 comprises:
- at least one sliding unit 114 comprising at least one sliding surface 116, wherein the sliding unit 114 is configured for sliding over at least one sample transport device 118 (not shown in FIG. 1) of the sample handling system 112; and
- at least one imaging streaming unit 120 comprising at least one camera 122, and optionally at least one power supply 146, wherein the camera 122 is configured for capturing a plurality of images, wherein the imaging streaming unit 120 comprises at least one imaging communication interface 124 for providing the plurality of captured images to at least one transport control system 126 (not shown in FIG. 1) of the sample handling system 112.

As can be seen in FIG. 1, the sliding unit 114 may comprise at least one mechanical and/or electrical interface configured for receiving the imaging streaming unit 120 and/or attaching the imaging streaming unit 120 and/or connecting with the imaging streaming unit 120. The sliding unit 114 and the imaging streaming unit 120 may be connected to each other, for example by at least one of a form-fit connection and a force-fit connection. The mechanical and/or electrical interface may comprise at least one hook, at least one clamping or the like.

The sliding unit 114 may comprise at least one actuation element 128. The actuation element 128 may be a magnetic actuation element 130. For example, the actuation element 128 may comprise at least one magnet. The actuation element 128 may be configured for magnetically interacting with the sample transport device 118, specifically with a driving means of the sample transport device 118. The driving means of the sample transport device 118 may be configured for generating a varying magnetic field and applying a driving force, in particular a magnetic force, without contact to the sliding unit 114 thereby moving the monitoring device 110. The sliding of the sliding unit 114 over the sample transport device 118 may be controllable by applying the driving force to the magnetic actuation element 130. The sliding unit 114 may comprise at least one housing 132 configured for housing the actuation element 128. The housing 132 may be configured for providing desired distribution of magnetic flux generated by the actuation element 128. For example, the housing 132 may comprise at least one iron body. Additionally or alternatively, the sliding surface 116 of the sliding unit 114 may be at least one mechanical part configured for providing sliding contact with a driving surface of the sample transport device 118.

The sliding unit 114 may comprise at least one electronic signaling device 134 for providing an electronic signal by sliding over the sample transport device 118. As will be outlined in further detail below, the sample transport device 118 may comprise a plurality of inductive sensors. The electronic signaling device 134 may be configured for interacting with the inductive sensors of the sample transport device 118. Specifically, by sliding over the sample transport device 118, the electronic signaling device 134 may be configured for inducing a signal in the inductive sensors of the sample transport device 118. The electronic signaling device 134 may comprise an electrically conducting element 136, specifically being made of at least one electroconductive element. For example, the electronic signaling device 134 may comprise a copper disc. The electronic signaling device 134 may be used to determine a position of the sliding unit 114 on the sample transport device 118, specifically by detecting the electronic signal via the plurality of inductive sensors of the sample transport device 118.

In the exemplary embodiment shown in FIG. 1, the imaging streaming unit 120 may comprise four cameras 122. However, in the view of FIG. 1, only two cameras 122 can be seen. The cameras 122 may be tilted towards a driving surface of the sample transport device 118. The cameras 122 of the imaging streaming unit 120 may be directed towards the sample transport device 118, specifically towards the driving surface of the sample transport device 118, i.e. tilted at a horizontal angle 138 of at least 15° towards the sample transport device 118. A field of view of the four cameras 122 may be rotated by 90° with respect to each other. The field of view may be a range of the environment visible through the camera 122. The imaging streaming unit 120, specifically comprising the four cameras 122, may be configured for providing an omnidirectional field of view.

The camera 122 of the imaging streaming unit 120 may specifically be an IP camera 140. The camera 122 may be a fixed-focus camera having at least one lens which is fixedly adjusted with respect to the camera 122 and, additionally or alternatively, may comprise at least color camera for providing color information, such as color values for three colors R, G, B. However, other cameras 122 are also feasible. Additionally or alternatively, the camera 122 may be configured for capturing a video stream.

The imaging communication interface 124 may be at least one web interface 142. The imaging communication interface 124 of the imaging streaming unit 120 may be configured for providing the plurality of captured images, specifically the captured video stream, to the transport control system 126. For example, the imaging communication interface 124 may specifically be configured for transferring image data acquired by the camera 122 to a computational device, such as a computer or a computer network of the transport control system 126. For example, the imaging communication interface 124 may be configured for transferring the plurality of captured images to the computational device. The transferring of the image data from the imaging communication interface 124 to the computational device may comprise an internet-based protocol, such as a transmission control protocol. In the exemplary embodiment of FIG. 1, the imaging communication interface 124 may comprise at least one wireless communication interface 144.

The monitoring device 110 may comprise at least one power supply 146 for providing electric power to the imaging streaming unit 120. For example, the power supply 146 may comprise at least one battery system 148, such as a battery system comprising a plurality of, in particular vertically stacked, batteries or a battery system comprising a single battery. The power supply 146 may be configured for providing an electric voltage of at least 4.8 V to the imaging streaming unit 120. The imaging streaming unit 120 may comprise, as an example, an ESP32 module with the at least one IP camera 140 and may be provided with electrical power by the power supply 146, for example by rechargeable battery system, providing at least 4.8 V.

Figure 2:
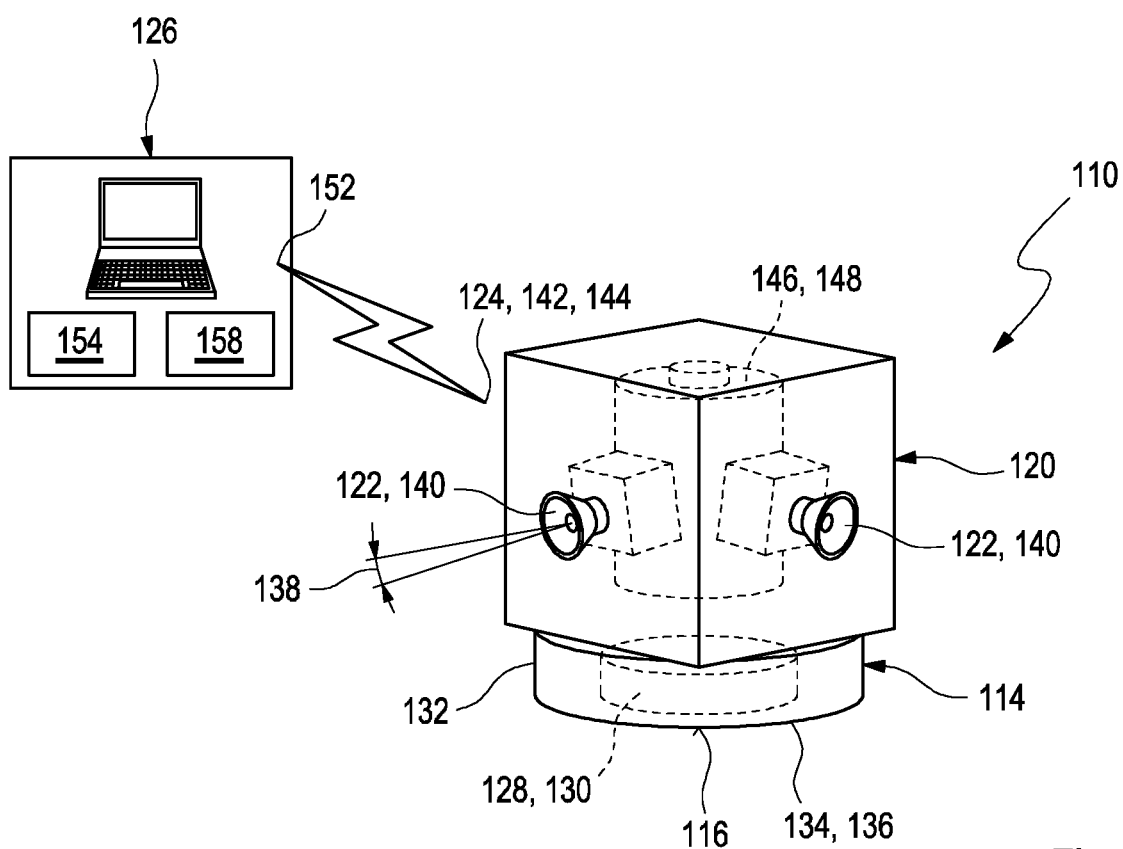
FIG. 2 shows an embodiment of a transport control system for controlling transport of a plurality of sample container holders of a sample handling system in a schematic view.

In FIG. 2, an exemplary embodiment of the transport control system 126 for controlling transport of a plurality of sample container holders 150 of the sample handling system 112 (not shown in FIG. 2) is shown in a schematic view. The transport control system 126 comprises at least one control communication interface 152 and at least one processing unit 154. The transport control system 126 may comprise at least one monitoring device 110 according the present invention, for example a monitoring device 110 according to the embodiment of FIG. 1. However, other embodiments of the monitoring device 110 are also feasible.

The control communication interface 152 of the transport control system 126 may specifically be configured for exchanging data or information with the imaging communication interface 124 of the monitoring device 110. The control communication interface 152 may retrieve the plurality of captured images provided by the imaging communication interface 124.

The processing unit 154 of the transport control system 126 is configured for evaluating the plurality of images thereby deriving at least one item of information on at least one obstacle 156 (not shown in FIG. 2). Deriving the at least one item of information comprises applying at least one trained object classification and detection model on the plurality of images. Specifically, the processing unit 154 may be configured for identifying and classifying the obstacle 156 in the plurality of images. The processing unit 154 may be configured for detecting a color of the at least one obstacle 156.

The item of information may specifically comprise information on the obstacle 156. For example, the item of information on the obstacle 156 may comprise at least one of: a presence of the obstacle 156; a classification of the obstacle 156; a status of movement of the obstacle 156; a color of the obstacle 156; a distance between the monitoring device 110 and the obstacle 156. The item of information may be derived by applying at least one trained object classification and detection model on the plurality of images. The object classification and detection model may specifically comprises a pre-trained convolutional neural network. The convolutional neural network may comprise at least one convolutional neural network selected from the group consisting of: AlexNet; Visual Geometry Group ("VGG") Net; residual neural network ("ResNet"); You Only Look Once ("YOLO"); Fast Region-Based Convolutional Network method ("R-CNN"), Region-based Fully Convolutional Network ("R-FCN"), Single Shot Detector ("SSD"), Spatial Pyramid Pooling (SPP-Net).

The processing unit 154 may specifically be configured for detecting the obstacle 156 in the plurality of images and for determining a distance between the monitoring device 110 and the obstacle 156. For example, the processing unit 154 may be configured for performing at least one of a method for identifying the obstacle 156 and a method for determining a distance between the obstacle 156 and the monitoring device 110, as will be outlined in further detail below. Thus, reference is made to the description of FIGS. 4 and 5.

The transport control system 126 is configured for controlling a functionality of the sample transport device 118 of the sample handling system 112 based on the item of information. The controlling the functionality of the sample transport device 118 may comprise controlling sliding of one or more of the monitoring device 110 and the sample container holders 150. The controlling the functionality of the sample transport device 118 based on the item of information may specifically comprise adapting the transport of the sample container holders 150 taking into account the item of information on the obstacle 156. The transport control system 126 may be configured for managing routing of the plurality of sample container holders 150. Thus, if an obstacle 156, such as an unexpected sample container holder or a spilled liquid sample, is detected by the processing unit 154, the position of the obstacle 15 on the sample transport device 118, in particular on the driving surface 166, may be determined and the derived item of information may be used by the transport control system 126 to adapt routing and avoid other sample container holders 150 or the monitoring device 110 to slide against or over the obstacle 156.

The transport control system 126 may comprise at least one user interface 158 such as at least one display device. The item of information about the obstacle 156 may be displayed by the user interface 158. The user interface 158 may be configured for at least one of displaying the item of information on the obstacle 156 to the user and displaying the plurality of captured images, specifically the video stream, to the user.

Figure 3:
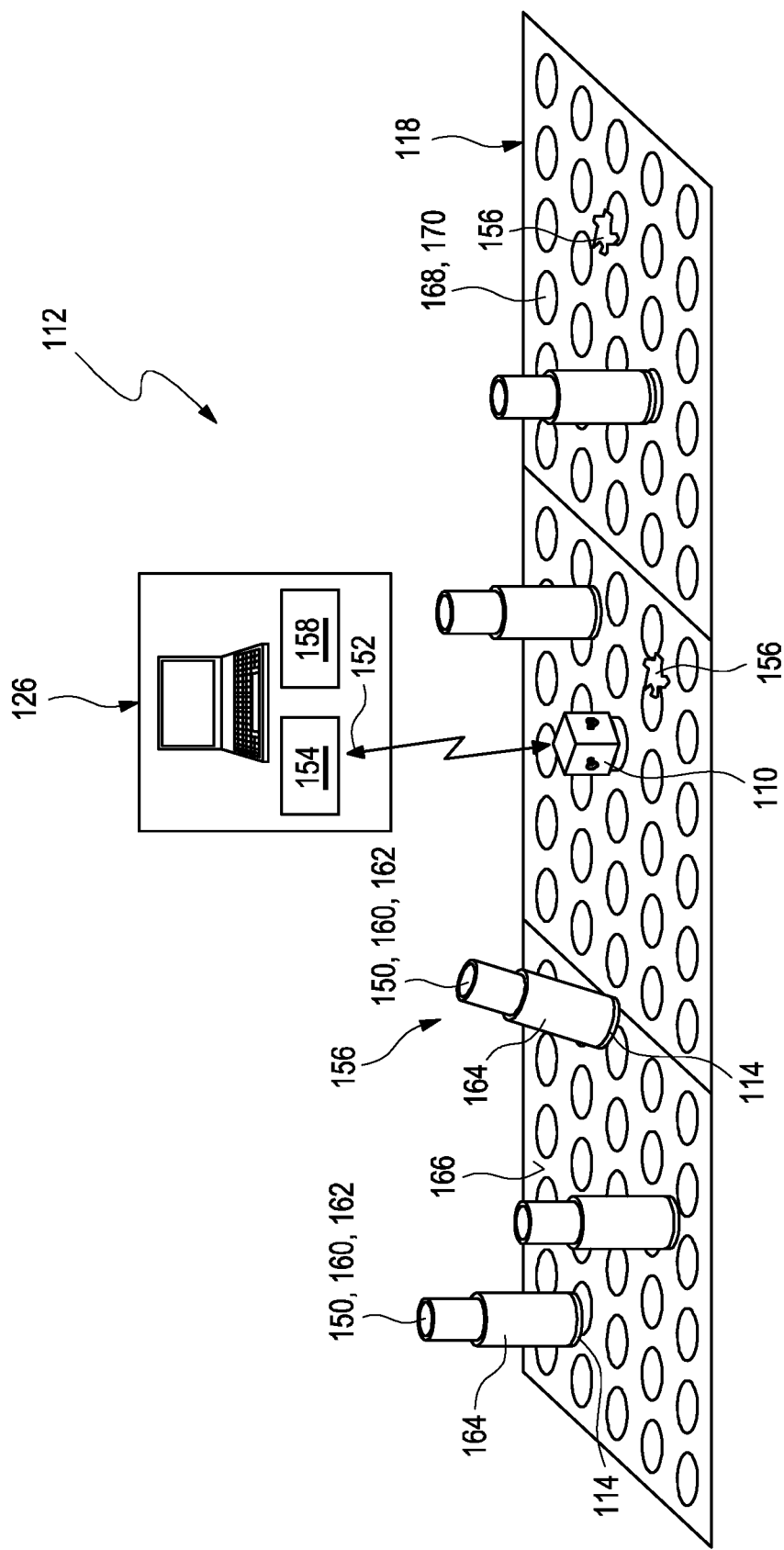
FIG. 3 shows an embodiment of a sample handling system for handling a plurality of samples in a schematic view.

FIG. 3 shows an embodiment of the sample handling system 112 for handling a plurality of samples 160 in a schematic view. The sample handling system 122 comprises a plurality of sample container holders 150 each configured for receiving a sample container 162. The sample container may be configured for receiving and holding the sample 160 to be handled.

The sample handling system 112 comprises at least one monitoring device according to the present invention, for example a monitoring device 110 according to the embodiment of FIG. 1. However, other embodiments of the monitoring device 110 are also feasible.

The sample handling system 112 comprises at least one sample transport device 118 configured for transporting the plurality of sample container holders 150 and the monitoring device 110. The sample transport device 118 is configured for two-dimensional transport of the sample container holders 150 and the monitoring device 110.

Further, the sample handling system 112 comprises at least one transport control system 126 for controlling transport of the plurality of sample container holders 150 via the sample transport device 118 considering the item of information on the at least one obstacle 156. The transport control system 126 of the sample handling system 112 may specifically be a transport control system 126 according to the present invention, such as exemplarily shown in FIG. 2. Thus, reference is made to the description of FIG. 2.

The sample container holder 150 may comprise at least one sliding unit 114 and at least one holding unit 164 for holding the sample container 162. Specifically, the sliding unit 114 of the sample container holder 150 may be embodied identical to the sliding unit 114 of the monitoring device 110.

The sample transport device 118 may comprise at least one driving surface 166. The sliding unit 114, specifically the sliding unit 114 comprised by at least one of the sample container holder 150 and the monitoring device 110, may be configured for sliding over the driving surface 166 of the sample transport device 118. The sample transport device may comprise a plurality of electromagnetic actuators 168, for example a plurality of electromagnetic coils. The plurality of electromagnetic actuator 168 may be arranged, for example in a checkerboard pattern, below the driving surface 166 and may be configured for magnetically interacting with the sliding unit 114. Additionally or alternatively, the sample transport device 118 may comprise a plurality of inductive sensors 170. The plurality of inductive sensor 170 may be configured for determining a position of the sliding unit 114 on the driving surface 166 of the sample transport device 118. For further details of the sample transport device, reference is made to the disclosure of WO 2011/138448 A1.

Figure 4:
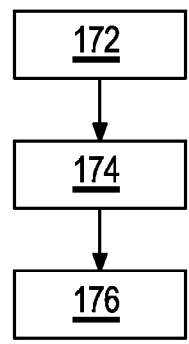
FIG. 4 shows a flow chart of a method for identifying at least one obstacle.

FIG. 4 shows a flow chart of an exemplary embodiment of a method for identifying the at least one obstacle 156. The method comprises the following steps which, as an example, may be performed in the given order. It shall be noted, however, that a different order is also possible. Further, it is also possible to perform one or more of the method steps once or repeatedly. Further, it is possible to perform two or more of the method steps simultaneously or in a timely overlapping fashion. The method may comprise further method steps which are not listed.

The method specifically may comprise using at least one monitoring device 110 according to the present invention, such as an embodiment of the monitoring device 110 shown in FIG. 1, and at least one transport control system 126 according to the present invention, such as an embodiment of the transport control system 126 shown in FIG. 2. However, other embodiments are also feasible.

The method comprises:
 i. (denoted by reference number 172) capturing a plurality of images at a plurality of sliding positions by using the at least one monitoring device 110 and providing the plurality of images via at least one imaging communication interface 120;
 ii. (denoted by reference number 174) retrieving the plurality of images via at least one control communication interface 152 of the at least one transport control system 126; and
 iii. (denoted by reference number 176) identifying the obstacle 156 by applying at least one trained object classification and detection model on the plurality of images by using at least one processing unit 154 of the transport control system 126.

Specifically, step i. may comprise capturing at least one video stream at the plurality of sliding positions by using the monitoring device 110. The providing the plurality of images may comprise streaming the video stream via at least one internet protocol, specifically by using the imaging communication interface 120.

Figure 5:
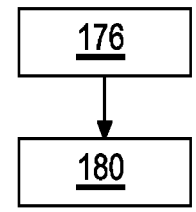
FIG. 5 shows a flow chart of a method for determining a distance between at least one obstacle and a monitoring device.

FIG. 5 shows a flow chart of an exemplary embodiment of method for determining a distance between at least one obstacle and a monitoring device. The method comprises the following steps which, as an example, may be performed in the given order. It shall be noted, however, that a different order is also possible. Further, it is also possible to perform one or more of the method steps once or repeatedly. Further, it is possible to perform two or more of the method steps simultaneously or in a timely overlapping fashion. The method may comprise further method steps which are not listed.

The method specifically may comprise using at least one monitoring device 110 according to the present invention, such as an embodiment of the monitoring device 110 shown in FIG. 1, and at least one transport control system 126 according to the present invention, such as an embodiment of the transport control system 126 shown in FIG. 2. However, other embodiments are also feasible.

The method comprises:
 a. (denoted by reference number 178) identifying at least one obstacle 156 using a method for identifying at least one obstacle 156 according to the present invention, such as exemplarily shown in FIG. 4, at at least one first sliding position and at at least one second sliding position different from the first sliding position by using the at least one monitoring device 110; and
 b. (denoted by reference number 180) determining the distance between the obstacle 156 and the monitoring device 110 by analyzing at least one first image captured at the first sliding position and at least one second image captured at the second sliding position and by determining the distance d according to:

$$\frac{y_2}{y_1} = 1 - \frac{m}{d},$$

wherein $y_1$ denotes a height of the obstacle 156 in the image at the first sliding position, $y_2$ denotes a height of the obstacle 156 in the image at the second sliding position, m denotes a distance travelled from the first sliding position to the second sliding position and d denotes the distance between the obstacle 156 and the monitoring device 110 at the first sliding position.

Specifically, method step a. may further comprise moving the monitoring device 110 from the first sliding position to the second sliding positions of the sample handling system 112 by using a sample transport device 118.

Figure 6:
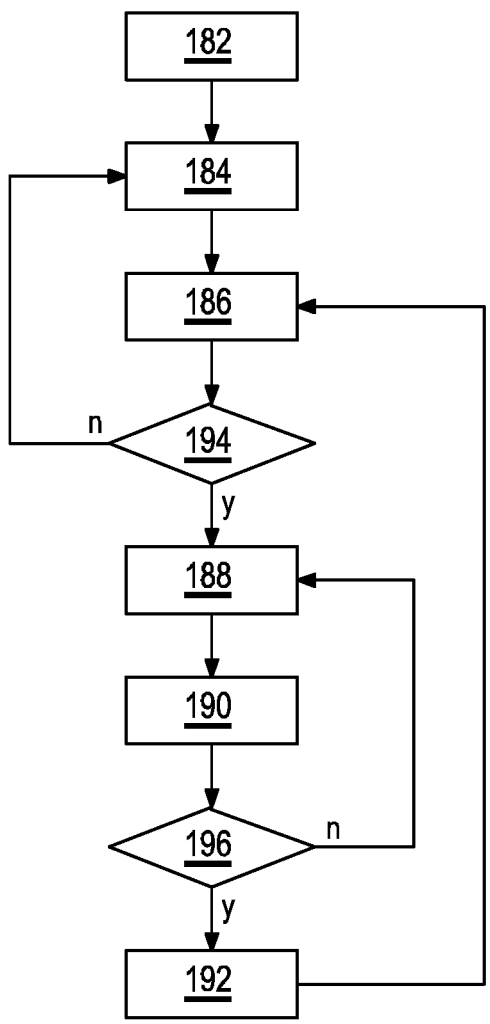
FIG. 6 shows a flow chart of a method for controlling a monitoring device.

FIG. 6 shows a flow chart of an exemplary embodiment of method for controlling a monitoring device 110. The method comprises the following steps which, as an example, may be performed in the given order. It shall be noted, however, that a different order is also possible. Further, it is also possible to perform one or more of the method steps once or repeatedly. Further, it is possible to perform two or more of the method steps simultaneously or in a timely overlapping fashion. The method may comprise further method steps which are not listed.

The method specifically may comprise using at least one monitoring device 110 according to the present invention, such as an embodiment of the monitoring device 110 shown in FIG. 1, and at least one transport control system 126 according to the present invention, such as an embodiment of the transport control system 126 shown in FIG. 2. However, other embodiments are also feasible.

The method comprises:
I. performing a method for identifying a least one obstacle 156 according to the present invention, such as exemplarily shown in FIG. 4, wherein at least one first image is captured at a first sliding position (denoted by reference number 182) and at least one second image is captured at the second sliding position different from the first sliding position (denoted by reference number 184) by using the at least one monitoring device 110, wherein the monitoring device 110 is slided in a first direction from the first sliding position to the second sliding position, wherein the first image and the second image are provided to the at least one transport control system 126, via at least one imaging communication interface 120 of the monitoring device 110 and at least one control communication interface 152 of the transport control system 126, wherein at least one trained object classification and detection model is applied on the first image and the second image by using at least one processing unit 154 of the transport control system 126 (denoted by reference number 186); and
II. if an obstacle was identified, sliding the monitoring device to a third sliding position in a direction different from the first direction (denoted by reference number 188) and preceding to step III, otherwise, maintaining the first direction and sliding the monitoring device to the third sliding position and repeating step I until an obstacle is identified;
III. (denoted by reference number 190) determining, by using the method for determining a distance between at least one obstacle 156 and a monitoring device 110 according to the present invention, such as exemplarily shown in FIG. 5, a distance between the identified obstacle 156 and the monitoring device 110;
IV. (denoted by reference number 192) providing at least one item of information on the identified obstacle 156 to the transport control system 126 if the determined distance in step III. is below a predetermined threshold, otherwise repeating step II.

As can be seen in FIG. 6, the method may comprise a first decision node 194, wherein at the first decision node 194, the method may comprise determining if an obstacle 156 was identified in the plurality of captured images. The method may comprise a second decision node 196, wherein at the second decision node 196, the method may comprise determining if the determined distance between the obstacle 156 and the monitoring device 110 is below the predetermined threshold.

Further, step II. may specifically comprise sliding the monitoring device 110 to the third sliding position whereby the distance in between the obstacle 156 and the monitoring device decreases 110. Thus, in step II., the monitoring device 110 may be moved towards the identified obstacle 156.

LIST OF REFERENCE NUMBERS 110 monitoring device
112 sample handling system
114 transportation unit, e.g. sliding unit
116 transportation, e.g. sliding surface
118 sample transport device
120 imaging streaming unit
122 camera
124 imaging communication interface
126 transport control system
128 actuation element
130 magnetic actuation element
132 housing
134 electronic signaling device
136 electrically conducting element
138 a horizontal angle
140 IP camera
142 web interface
144 wireless communication interface
146 power supply
148 battery system
150 sample container holders
152 control communication interface
154 processing unit
156 obstacle
158 user interface
160 sample
162 sample container
164 holding unit
166 driving surface
168 electromagnetic actuator
170 of inductive sensors
172 capturing a plurality of images at a plurality of sliding positions
174 retrieving the plurality of images
176 identifying the obstacle
178 identifying at least one obstacle
180 determining the distance between the obstacle and the monitoring device
182 capturing at least one first image at a first sliding position
184 capturing at least one second image at the second sliding position
186 applying at least one trained object classification and detection model on the first image and the second image
188 sliding the monitoring device to a third sliding position in a direction different from the first direction
190 determining a distance between the identified obstacle and the monitoring device
192 providing at least one item of information
194 first decision node
196 second decision node

The invention claimed is:

1. A method for determining a distance between at least one obstacle and a monitoring device, the method comprising:
   a. identifying at least one obstacle at at least one first position of the monitoring device and at at least one second position of the monitoring device different from the first position by using at least one monitoring device, wherein identifying the obstacle comprises:
      i. capturing a plurality of images at a plurality of positions of the monitoring device by using the monitoring device and providing the plurality of images via at least one imaging communication interface;
      ii. retrieving the plurality of images via at least one control communication interface of at least one transport control system; and iii. identifying the obstacle by applying at least one trained object classification and detection model on the plurality of images by using at least one processing unit of the transport control system;

wherein the monitoring device comprises:

at least one transportation unit comprising at least one transportation surface, wherein the transportation unit is configured for transporting the monitoring device over at least one sample transport device of a sample handling system; and at least one imaging streaming unit comprising at least one camera, wherein the camera is configured for capturing a plurality of images, wherein the imaging streaming unit comprises the imaging communication interface for providing the plurality of captured images to the transport control system of the sample handling system, wherein the transport control system comprises the control communication interface, wherein the transport control system further comprises the processing unit for evaluating a plurality of images thereby deriving at least one item of information on the obstacle, wherein deriving the at least one item of information comprises applying at least one trained object classification and detection model on the plurality of images, wherein the transport control system is configured for controlling a functionality of the sample transport device of the sample handling system based on the item of information; and b. determining the distance between the obstacle and the monitoring device by analyzing at least one first image captured at the first position and at least one second image captured at the second position and by determining the distance d according to:

$$\frac{y_2}{y_1} = 1 - \frac{m}{d},$$

wherein $y_1$ denotes a height of the obstacle in the image at the first position, $y_2$ denotes a height of the obstacle in the image at the second position, m denotes a distance travelled from the first position to the second position and d denotes the distance between the obstacle and the monitoring device at the first position, wherein the obstacle is any object impeding the transport of sample container holders on the sample transport device.

2. The method according to claim 1, wherein the method further comprises:

I. identifying the obstacle, wherein the first image is captured at the first position of the monitoring device and the second image is captured at the second position of the monitoring device different from the first position by using the monitoring device, wherein the monitoring device is transported in a first direction from the first position to the second position, wherein the first image and the second image are provided to the transport control system via the imaging communication interface of the monitoring device and the control communication interface of the transport control system, wherein the trained object classification and detection model is applied on the first image and the second image by using the processing unit of the transport control system; and II. if an obstacle was identified, transporting the monitoring device to a third position of the monitoring device in a direction different from the first direction and preceding to step III, otherwise, maintaining the first direction and transporting the monitoring device to the third position and repeating step I until an obstacle is identified;

III. determining the distance between the identified obstacle and the monitoring device;

IV. providing the item of information on the identified obstacle to the transport control system if the determined distance in step III is below a predetermined threshold, otherwise repeating step II.

3. A sample handling system for handling a plurality of samples, wherein the sample handling system is configured for performing the method for determining a distance between at least one obstacle and a monitoring device, wherein the sample handling system comprises:

a plurality of sample container holders each configured for receiving a sample container;

the monitoring device;

at least one sample transport device configured for transporting the plurality of sample container holders and the monitoring device, wherein the sample transport device is configured for two-dimensional transport of the sample container holders and the monitoring device, wherein the sample transport device comprises a driving surface for driving the monitoring device, wherein the monitoring device is configured for being transported over the driving surface, wherein the sample container holders comprise at least one transportation unit configured for being transported over the driving surface of the sample transport device; and the transport control system for controlling transport of the plurality of sample container holders via the sample transport device considering the item of information on the at least one obstacle.

4. The sample handling system according to claim 3, wherein the sample container holder comprises at least one transportation unit and at least one holding unit, wherein the transportation unit of the sample container holder is embodied identical to the transportation unit of the monitoring device.

5. The sample handling system according to claim 3, wherein the imaging streaming unit is attached and/or mounted to the transportation unit.

6. The sample handling system according to claim 3, wherein the camera of the imaging streaming unit comprises at least one of: an IP camera; a wireless camera; a network camera; a light-weight camera; a single vision camera; a wide-angle camera; fixed focus lens camera.

7. The sample handling system according to claim 3, wherein the camera of the imaging streaming unit comprises at least one color camera.

8. The sample handling system according to claim 3, wherein the imaging streaming unit comprises at least four cameras, wherein a field of view of the four cameras are rotated by 90° with respect to each other.

9. The sample handling system according to claim 3, wherein the at least one item of information on the obstacle comprises at least one of: a presence of the obstacle; a classification of the obstacle; a position of the obstacle on a driving surface; a status of movement of the obstacle; a color of the obstacle; a distance between the monitoring device and the obstacle.

10. The sample handling system according to claim 3, wherein the trained object classification and detection model comprises a pre-trained convolutional neural network, wherein the pre-trained convolutional neural network comprises at least one convolutional neural network selected from the group consisting of: AlexNet; Visual Geometry Group Net; residual neural network; You Only Look Once; Fast Region-Based Convolutional Network method, Region-based Fully Convolutional Network, Single Shot Detector, Spatial Pyramid Pooling, and/or wherein the trained object classification and detection model comprises a pre-trained classical classification machine learning algorithm comprising one or more of k-nearest neighbors algorithm, support vector-machine.

11. The sample handling system according to claim 3, wherein the transport control system is configured for controlling transportation of sample container holders over the sample transport device, wherein the transport control system is configured for controlling transportation of the monitoring device over the sample transport device.

12. A computer program comprising instructions which, when the program is executed by a computer or computer network, cause the computer or computer network to perform the method for determining a distance between at least one obstacle and a monitoring device according to claim 1.

* * * * *